United States Patent
Lan et al.

(10) Patent No.: US 10,958,201 B2
(45) Date of Patent: Mar. 23, 2021

(54) METHODS AND SYSTEMS FOR BRUSHLESS MOTOR CONTROL

(71) Applicant: SZ DJI TECHNOLOGY CO., LTD., Shenzhen (CN)

(72) Inventors: Qiu Lan, Shenzhen (CN); Changxing Zhou, Shenzhen (CN); Wanqi Liu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/287,755

(22) Filed: Feb. 27, 2019

(65) Prior Publication Data

US 2019/0207543 A1    Jul. 4, 2019

Related U.S. Application Data

(63) Continuation of application No. PCT/CN2016/097576, filed on Aug. 31, 2016.

(51) Int. Cl.
*H02P 21/18* (2016.01)
*H02P 21/22* (2016.01)
(Continued)

(52) U.S. Cl.
CPC .............. *H02P 21/13* (2013.01); *B60L 15/20* (2013.01); *B64C 39/024* (2013.01); *B64D 27/24* (2013.01); *B64D 31/00* (2013.01); *H02P 6/08* (2013.01); *H02P 6/16* (2013.01); *H02P 21/18* (2016.02); *H02P 21/22* (2016.02); *H02P 27/12* (2013.01);
(Continued)

(58) Field of Classification Search
CPC ......... B64C 39/12; B64C 39/00; B64C 39/02; B64D 31/00; B60L 2200/10; B60L 15/20; H02P 21/18; H02P 21/22; H02P 6/08; H02P 21/13; H02P 27/12; H02P 6/16
See application file for complete search history.

(56) References Cited

U.S. PATENT DOCUMENTS 4,623,826 A * 11/1986 Benjamin ................. H02P 6/20
318/400.21
7,002,318 B1 * 2/2006 Schulz .................. B60L 3/0038
318/437

(Continued)

FOREIGN PATENT DOCUMENTS

| CN | 101873094 A | 10/2010 |
|---|---|---|
| CN | 103279128 A | 9/2013 |
| CN | 104734580 A | 6/2015 |

OTHER PUBLICATIONS

The World Intellectual Property Organization (WIPO) International Search Report and Written Opinion for PCT/CN2016/097576 May 31, 2017 11 pages.

(Continued)

*Primary Examiner* — Thai T Dinh
(74) *Attorney, Agent, or Firm* — Anova Law Group, PLLC

(57) ABSTRACT

A method of controlling a motor includes determining a first motor controlling parameter measurement based on a signal received from a position sensor, determining a second motor controlling parameter based on one or more motor electrical parameters, and controlling operation of the motor based on at least one of the first motor controlling parameter measurement or the second motor controlling parameter measurement.

19 Claims, 12 Drawing Sheets

(51) Int. Cl.
- *H02P 21/13* (2006.01)
- *H02P 6/08* (2016.01)
- *H02P 6/16* (2016.01)
- *B60L 15/20* (2006.01)
- *B64C 39/02* (2006.01)
- *B64D 27/24* (2006.01)
- *B64D 31/00* (2006.01)
- *H02P 27/12* (2006.01)
- *H02K 29/08* (2006.01)

(52) U.S. Cl.
CPC ..... *B60L 2200/10* (2013.01); *B64C 2201/042* (2013.01); *H02K 29/08* (2013.01)

(56) References Cited

U.S. PATENT DOCUMENTS

| | | | | |
|---|---|---|---|---|
| 8,847,529 | B2* | 9/2014 | Dixon | H02P 29/0241 |
| | | | | 318/400.02 |
| 9,071,184 | B2* | 6/2015 | Kuroda | H02P 23/0077 |
| 9,780,705 | B2* | 10/2017 | Lin | H02P 6/26 |
| 2006/0022630 | A1* | 2/2006 | Spurr | E05B 81/64 |
| | | | | 318/650 |
| 2007/0153435 | A1* | 7/2007 | Wang | H02H 7/093 |
| | | | | 361/31 |
| 2008/0099629 | A1* | 5/2008 | Abel | B64C 13/10 |
| | | | | 244/223 |
| 2009/0072083 | A1 | 3/2009 | Hanlon et al. | |
| 2010/0052581 | A1* | 3/2010 | Izumi | H02P 21/18 |
| | | | | 318/400.04 |
| 2013/0106340 | A1* | 5/2013 | Chabaud | B62D 5/046 |
| | | | | 318/806 |
| 2014/0055067 | A1* | 2/2014 | Kuroda | H02P 23/0077 |
| | | | | 318/400.32 |
| 2016/0304194 | A1* | 10/2016 | Bevirt | B64C 39/068 |
| 2017/0052208 | A1* | 2/2017 | Reddy | G01P 21/02 |
| 2018/0183366 | A1* | 6/2018 | Hara | H02P 6/12 |
| 2018/0367073 | A1* | 12/2018 | Haas | H02P 6/16 |

OTHER PUBLICATIONS

Peng Li et al., A Study on Redundant Detection Method for BLDC Motor Rotor Position. Electrical Automation, pp. 1-3, 17, vol. 36, No. 2, Mar. 2014, China Academic Journal Electronic Publishing House, China.

Jing Cao, et al., Driving Control System of REPM Brushless DC Motor based on MSP430, Micromotors, pp. 34-37, vol. 38, No. 5, 2005, China Academic Journal Electronic Publishing House, China.

* cited by examiner

METHODS AND SYSTEMS FOR BRUSHLESS MOTOR CONTROL

CROSS-REFERENCE TO RELATED APPLICATION

This application is a continuation of International Application No. PCT/CN2016/097576, filed on Aug. 31, 2016, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to brushless motor control and, more particularly, to methods and systems for brushless motor control using a sensor and a sensorless method for determining motor controlling parameter.

BACKGROUND

Brushless direct current ("BLDC") motors, or electrically commutated motors ("ECM" or "EC motors"), such as permanent magnet synchronous motors ("PMSM"), are used in many devices to provide a controllable power input for performing work upon an object. Recently, the use of BLDC motors in appliances and other devices has greatly increased because of advantages that BLDC motors exhibit over other types of motors, such as brushed motors. Such advantages include higher power to weight ratio, better reliability, and longer lifetime (due in part to the lack of brush contacts). These advantages allow BLDC motors to be more efficient than other types of motors, which can result in less energy consumption and lower operational costs of motorized devices. Another advantage of BLDC motors is that they can be smaller and lighter than other types of motors, and can be used in a greater number of applications with strict size and weight constraints.

For example, BLDC motors are particularly useful for powering unmanned aerial vehicles ("UAV") because of their compact construction, light weight, and high power to weight ratio. UAVs, sometimes referred to as "drones," typically include a plurality of motors to drive one or more propulsion devices (e.g., propellers, fans, etc.) for providing lift, thrust, and steering during flight. Each propulsion device is usually powered by a separate motor to allow for a high degree of maneuverability and control. The compact yet powerful nature of BLDC motors allows for UAVs to be smaller, more agile, and more efficient than is possible with other types of motors.

Advances in controller hardware and software technologies have also helped spread the applicability of BLDC motors to compact and portable electronic devices, including UAVs. Specifically, advances in controller technologies have improved control of the commutation process in brushless motors (i.e., the control of phase switching among the motor windings), which highlights a key difference between brushed and brushless motors. Unlike brushed motors, in which commutation is performed through a mechanical process of contacting brushes with commutators to sequentially energize the windings as the motor rotates, BLDC motors use control circuitry to sequentially apply current to each motor winding for driving the rotor in a desired direction (e.g., forward or reverse). In order to achieve smooth and continuous operation, the commutation control circuitry must have accurate knowledge of the motor electrical angle (i.e., the magnetic field position of the permanent magnet) in order to determine when to apply current to each winding.

Known methods of determining the motor electrical angle include using multiple rotor position sensors, such as low-resolution Hall Effect sensors, or high-resolution incremental encoders. Because of the high cost of encoders, BLDC motors have typically included a number of Hall Effect sensors (usually three) positioned within the motor housing for determining the rotor position and direction of rotation. However, the use of multiple Hall Effect sensors increases the cost and complexity of the motor by requiring additional hardware, which also increases the size and weight of the motor. Additionally, Hall Effect sensors are susceptible to noise interference and require estimation techniques for determining the rotor position between sensors, which can cause the motor to respond slowly to load changes.

Alternative methods of determining the rotor position include using "sensorless" techniques. For example, a common sensorless technique known as the "zero crossing" method involves estimating the rotor electrical angle based on the back EMF (electromotive force) produced when the permanent magnet of the rotor passes an un-energized winding. Although known sensorless techniques may allow for instantaneous rotor position estimations, this method uses algorithms that rely on knowing certain motor parameters, such as winding resistance and inductance, motor speed, and input voltage, which may not remain constant under all operating conditions. As a result, the estimated electrical angle may not be accurate under all circumstances or at all speed ranges.

Accordingly, there is a need for improved systems and methods for determining the rotor electrical angle to allow for more accurate commutation and motor control under wider ranges of operating conditions.

SUMMARY

In one aspect, the present disclosure relates to a method of controlling a motor. The method may include generating a first motor controlling parameter measurement based on a signal received from a position sensor, generating a second motor controlling parameter measurement based on one or more motor electrical parameters, and controlling operation of the motor based on at least one of the first motor controlling parameter measurement or the second motor controlling parameter measurement.

In another aspect, the present disclosure relates to a system for controlling a motor. The system may include a controller having one or more processors and being configured to determine a first motor controlling parameter measurement based on a signal received from a position sensor, determine a second motor controlling parameter based on one or more motor electrical parameters, and control operation of the motor based on one of the first and second motor controlling parameter measurements.

In yet another aspect, the present disclosure relates to an unmanned aerial vehicle (UAV) system, comprising one or more propulsion devices, each being operably connected to a motor; and a controller in communication with the one or more propulsion devices and configured to control operation of each motor, the controller comprising one or more processors configured to determine a first motor controlling parameter measurement based on a signal received from a position sensor, determine a second motor controlling parameter based on one or more motor electrical parameters, and control operation of the motor based on one of the first and second motor controlling parameter measurements.

In yet another aspect, the present disclosure relates to a non-transitory computer-readable medium storing instructions, that, when executed, cause a computer to perform a method of controlling a motor, the method comprising generating a first motor controlling parameter measurement based on a signal received from a position sensor, generating a second motor controlling parameter measurement based on one or more motor electrical parameters, and controlling operation of the motor based on one of the first and second motor controlling parameter measurements.

In yet another aspect, the present disclosure relates to a method of controlling a motor. The method may include generating a first motor controlling parameter measurement based motor electrical parameters, and controlling operation of the motor based on a second motor controlling parameter measurement when the first motor controlling parameter is determined to be abnormal, wherein the second motor controlling parameter is based on a signal received from a position sensor.

In another aspect, the present disclosure relates to a system for controlling a motor. The system may include a controller having one or more processors and being configured to generate a first motor controlling parameter measurement based motor electrical parameters and control operation of the motor based on a second motor controlling parameter measurement when the first motor controlling parameter is determined to be abnormal, wherein the second motor controlling parameter is based on a signal received from a position sensor.

In yet another aspect, the present disclosure relates to an unmanned aerial vehicle (UAV) system, comprising one or more propulsion devices, each being operably connected to a motor; and a controller in communication with the one or more propulsion devices and configured to control operation of each motor, the controller comprising one or more processors configured to generate a first motor controlling parameter measurement based motor electrical parameters and control operation of the motor based on a second motor controlling parameter measurement when the first motor controlling parameter is determined to be abnormal, wherein the second motor controlling parameter is based on a signal received from a position sensor.

In yet another aspect, the present disclosure relates to a non-transitory computer-readable medium storing instructions, that, when executed, cause a computer to perform a method of controlling a motor, the method comprising generating a first motor controlling parameter measurement based motor electrical parameters, and controlling operation of the motor based on a second motor controlling parameter measurement when the first motor controlling parameter is determined to be abnormal, wherein the second motor controlling parameter is based on a signal received from a position sensor

DETAILED DESCRIPTION

Figure 1:
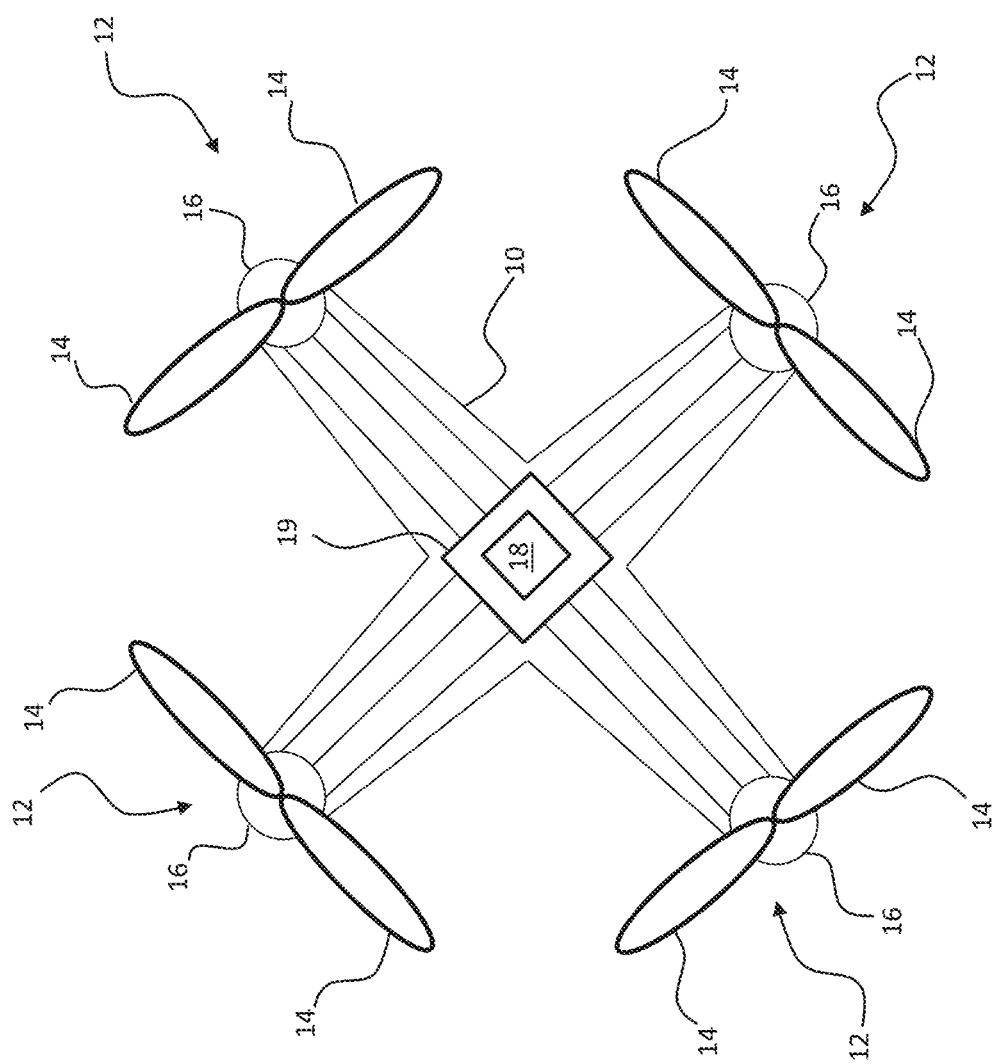
FIG. 1 shows a schematic illustration of an exemplary movable object having a control system consistent with embodiments of the present disclosure.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

As used herein, the term "sensorless" may refer to methods, processes, calculations, algorithms, and/or other activities for determining one or more motor controlling parameters, such as a motor angle (e.g., an electrical angle or an angular position of a motor), a rotational speed, etc., that do not rely on the use of a position sensor.

As used herein, the term "position sensor" may refer to sensors, sensory devices, or sensory systems configured to generate a signal for determining a motor angle without knowledge of motor electrical parameters. "Position sensors" may be devices that are configured to detect the physical position and/or movement of a motor or one or more motor components.

As used herein, the term "motor electrical parameters" may refer to electrical, magnetic, or electromagnetic parameters, such as voltage, current, resistance, inductance, reluctance, impedance, magnetic flux, magnetic field density, or others, of a motor or one or more motor components that cause or affect operation of the motor.

Unmanned aerial vehicles (UAV) are recognized in many industries and in many situations as useful tools for relieving personnel of the responsibility for directly performing certain tasks. For instance, UAVs have been used to deliver cargo, conduct surveillance, and collect various types of imaging and sensory data (e.g., photo, video, ultrasonic, infrared, etc.) in professional and recreational settings, providing great flexibility and enhancement of human capabilities.

Although they may be "unmanned," that is, operated without onboard personnel, UAVs are often fully or partially operated by off-board personnel who may be responsible for controlling multiple aspects of flight and/or other associated tasks (e.g., controlling cargo, operating imaging equipment, etc.). Thus, in many situations, the UAV operator is responsible for maintaining stable, controlled flight of the UAV and for avoiding possible damage to the UAV or its cargo (e.g., which may be caused by collisions with other objects, hard landings, etc.). In other situations, the UAV may be fully or partially controlled by an automated flight control system, which may also be responsible for ensuring the UAV is operated effectively and without causing damage to the UAV or its cargo.

Whether performed manually or automatically, UAV flight control essentially consists of controlling one or more propulsion devices attached to the UAV and configured to provide lift, thrust, and steering capabilities. UAV propulsion devices are commonly driven by electric motors, with each propulsion device powered by a separate motor. Brushless DC motors are often selected for their higher power to weight ratio, better reliability, and longer lifetime as compared with brushed motors. However, since brushless DC motors require more complicated commutation control than brushed motors, care must be taken to ensure that commutation control is robust and effective in different types of situations.

Robust commutation control is particularly important as it relates to motor stall events. A stall event may arise when a motor is prevented from being driven, either by a physical impediment (i.e., something blocking the propulsion device) or a control fault. Attempting to drive an electric motor during a stall event can lead to undesirable outcomes, such as overheating of the motor, which can cause damage to motor components. Further, if a stall event occurs during flight, a sudden loss of lift and/or thrust can occur, which may result in uncontrolled descent and possible damage to the UAV and its cargo. Embodiments of the present disclosure overcome certain challenges and provide robust commutation control of DC motors for use with UAVs and other devices.

FIG. 1 shows an exemplary movable object 10 that may be configured to move or travel within an environment. Movable object 10 may be any suitable object, device, mechanism, system, or machine configured to travel on or within a suitable medium (e.g., a surface, air, water, rails, space, underground, etc.). For example, movable object 10 may be an unmanned aerial vehicle (UAV). Although movable object 10 is shown and described herein as a UAV for exemplary purposes of this description, it is understood that other types of movable object (e.g., wheeled objects, nautical objects, locomotive objects, other aerial objects, etc.) may also or alternatively be used in embodiments consistent with this disclosure. As used herein, the term UAV may refer to an aerial device configured to be operated and/or controlled automatically (e.g., via an electronic control system) and/or manually by off-board personnel.

Movable object 10 may include one or more propulsion assemblies 12 and may be configured to carry a payload (not shown). Movable object 10 may include one or more (e.g., 1, 2, 3, 3, 4, 5, 10, 15, 20, etc.) propulsion assemblies 12 positioned at various locations on movable objet 10 (for example, top, sides, front, rear, and/or bottom of movable object 10) for propelling and steering movable object 10. Propulsion assemblies 12 may be devices or systems operable to generate forces for sustaining controlled flight. Propulsion assemblies 12 may include one or more propulsion devices 14 configured to participate in the generation of forces for sustaining controlled flight. Propulsion devices 14 may be drivably connected to a power source, such as a motor 16, mounted to movable object 10.

For example, propulsion devices 14 may include rotors, propellers, blades, nozzles, etc., which may be driven on or by a shaft, axle, wheel, hydraulic system, pneumatic system, or other component or system configured to transfer power from motor 16 to propulsion devices 14. Propulsion assemblies 12 and/or propulsion devices 14 may be adjustable (e.g., tiltable) with respect to each other and/or with respect to movable object 10. Alternatively, propulsion assemblies 12 and propulsion devices 14 may have a fixed orientation with respect to each other and/or movable object 10. In some embodiments, each propulsion assembly 12 may be of the same type. In other embodiments, propulsion assemblies 12 may be of different types. In some embodiments, all propulsion assemblies 12 may be controlled in concert (e.g., all at the same speed and/or angle). In other embodiments, one or more propulsion devices may be independently controlled with respect to, e.g., speed and/or angle.

Movable object 10 may include one or more motors 16. For instance, as shown in the embodiment of FIG. 1, movable object 10 may include one motor 16 for each propulsion assembly 12 attached to movable object 10. In other embodiments, one or more propulsion assemblies 12 may share or otherwise be powered by a common motor 16. Movable object 10 may include a main controller 19 and/or at least one motor controller 18. Each motor controller 18 may be electronically connected to one or more motor 16 and configured to selectively operate the one or more motor 16 to drive propulsion assemblies 12.

Figure 2:
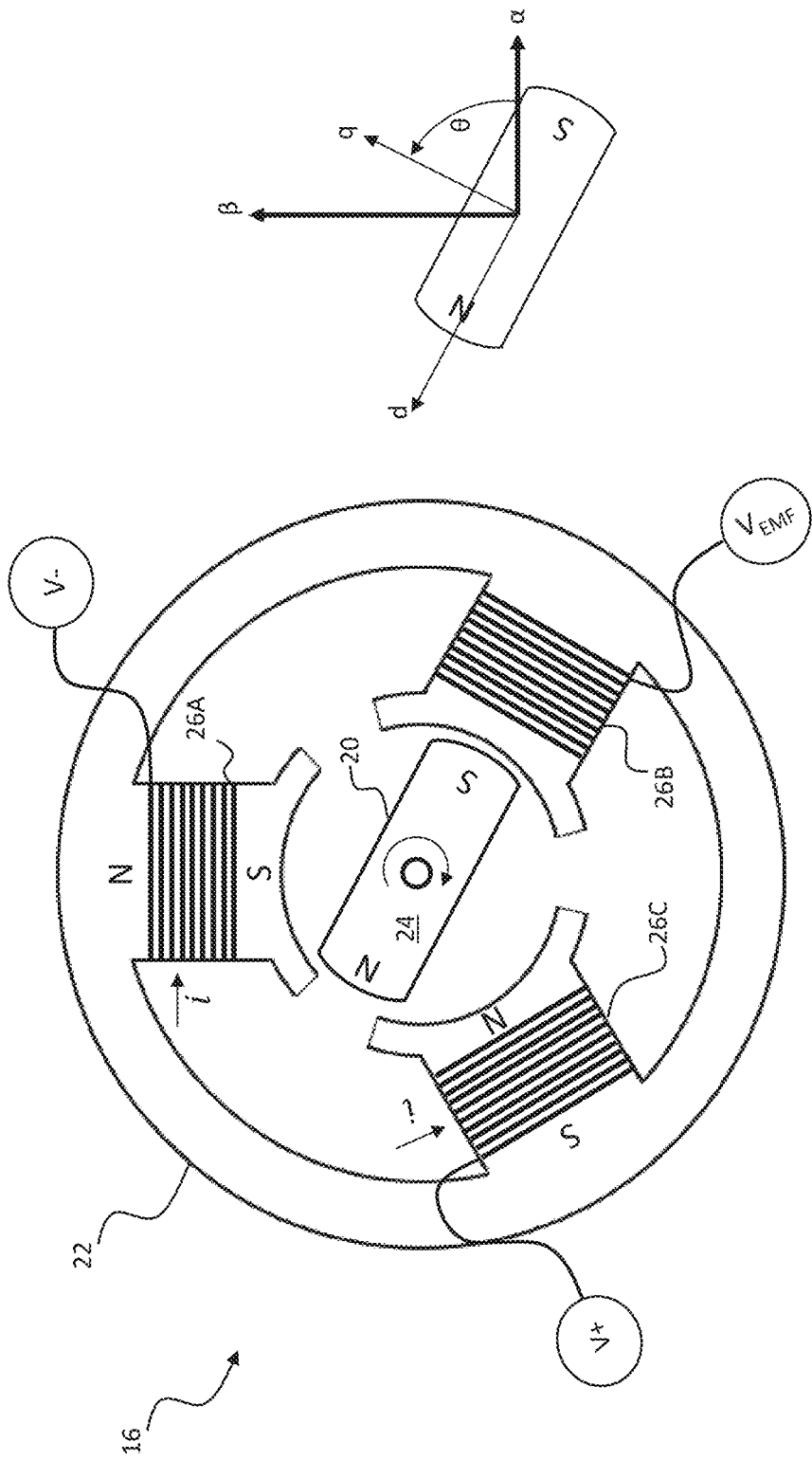
FIG. 2 shows an exemplary brushless motor consistent with embodiments of the present disclosure.

As shown in FIG. 2, motor 16 may be a brushless DC motor. Motor 16 may include a rotor 20 and a stator 22 positioned within a motor case or body (not shown). Rotor 20 may be configured to rotate within motor 16 (e.g., on an axle or shaft), and stator 22 may be configured to remain stationary. Rotor 20 may include a permanent magnet 24, and stator 22 may include one or more windings 26A-C. The embodiment of FIG. 2 shows rotor 20 centrally or internally located with respect to windings 26A-C. In other embodiments, windings 26A-C of stator 22 may be centrally or internally located with respect to rotor 20, and rotor 20 may be configured to rotate around the outside of windings 26A-C.

As shown in FIG. 2, motor 16 may be a three-phase motor. That is, motor 16 may be configured to energize windings 26A-C in a three-phase pattern. The term "phase" may refer to when one or more of windings 26A-C is energized. In the embodiment of FIG. 2, the three phases may include the sequential energizing of each of the three separate windings 26A, 26B, and 26C. When each winding 26A-C is energized (i.e., when a voltage is applied across the winding), current passing through the winding generates a magnetic field around the winding. The magnetic field generated by each winding 26A-C may interact with the magnetic field of permanent magnet 24 to either attract or repel the north or south pole of permanent magnet 24, depending on the direction of current flow through each winding 26A-C, to cause rotation of permanent magnet 24 within motor 16. When magnet 24 passes a winding that is not energized, movement of the magnetic field associated with permanent magnet 24 may induce a current the non-energized winding. By controlling the timing at which each winding 26A-C is energized and de-energized, rotation of magnet 24, and hence of motor 16, can be controlled. This process is known as commutation.

In order to effectively perform motor commutation, a motor controlling parameter, such as a motor speed n or an angular displacement (referred to as electrical angle θ) between the rotor 20 (i.e., the poles of magnet 24 of rotor 20) and windings 26A-C, must be known. The electrical angle θ may be understood as an angular offset between a stator reference frame, for example, defined by α and β axes, and a rotor reference frame, for example, defined by d and q axes. The α and β axes may be fixed references axes with respect to stator 22 used to define the location of stator components (e.g., windings 26A-C). The d and q axes may be fixed with respect to rotor 20 but movable with respect to the α and β axes. When rotor 20 moves during operation of motor 16, the d and q axes may move with respect to the α and β, and the electrical angle θ may be defined as the angular difference, for example, between the d axis and either of the α or β axes or between the q axis and either of the α and β axes. When the electrical angle θ is known, motor controller 18 may be able energize windings 26A-C at appropriate times to effectively control the speed and rotational direction of rotor 20, and hence motor 16.

Figure 3A:
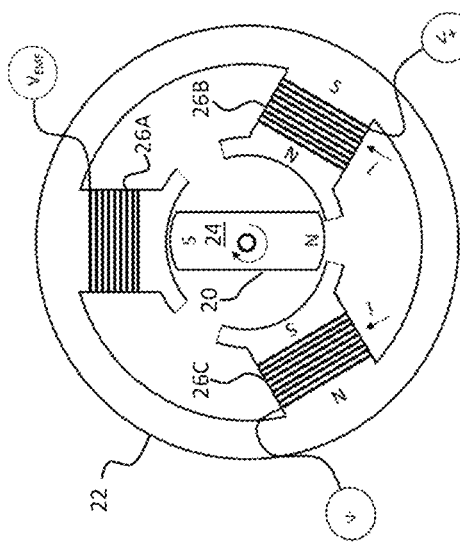
FIGS. 3A-3F show an exemplary brushless motor consistent with embodiments of the present disclosure.

FIGS. 3A-F show six possible stages of three-phase motor commutation for controlling clockwise rotation of rotor 20. It should be understood that counterclockwise rotation may also be controlled using similar or different stages by varying the direction of current passing through windings 26A-C. While FIG. 3A is discussed first for purposes of convenience, it should be understood that rotor 20 may be positioned at any electrical angle θ when motor commutation begins. In FIG. 3A, the north pole of magnet 24 is between windings 26A and 26B, and the south pole of magnet 24 is aligned with winding 26C. Winding 24A is energize to produce a magnetic field having a north pole at its inner side to repel the north pole of magnet 24, while winding 26B is energized to produce a magnetic field having a south pole at its inner side to attract the north pole of magnet 24, thereby causing clockwise rotation of rotor 20. Winding 26C is not energized during this stage, but the motion of magnet 24 induces a current in winding 26, and thus a voltage known as an electromotive force ("EMF") or back-EMF ("BEMF"). Back-EMF may refer a voltage that occurs across the terminals of a winding in a motor when there is relative motion between the magnetic field of the motor's permanent magnets and the motor's windings, pursuant to Faraday's Law of Induction.

Figure 3B:
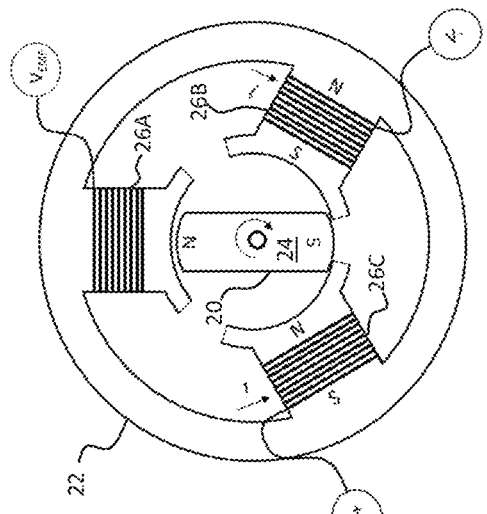
Figure 3C:
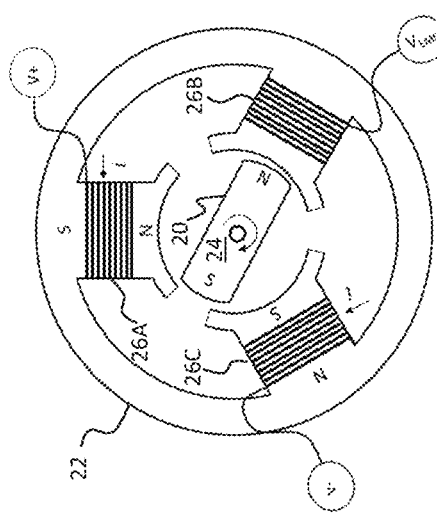
Figure 3D:
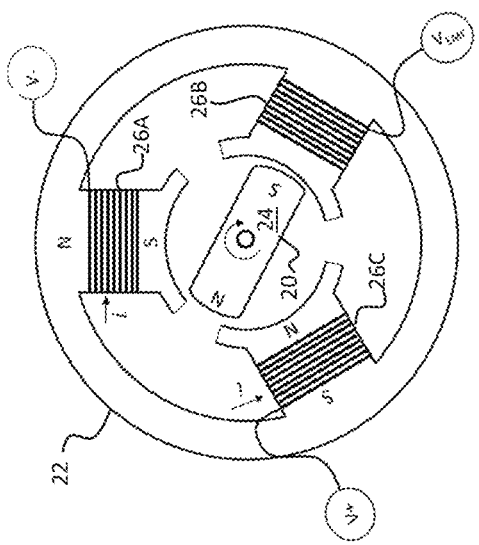
Figure 3E:
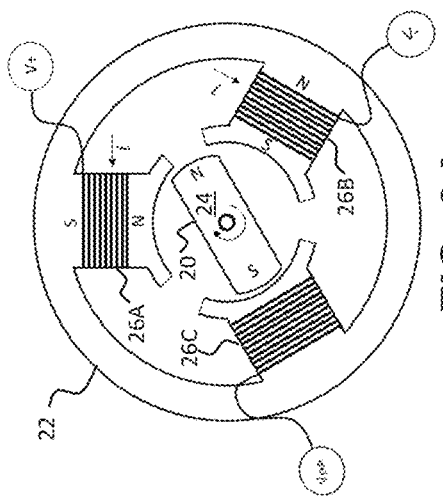
Figure 3F:
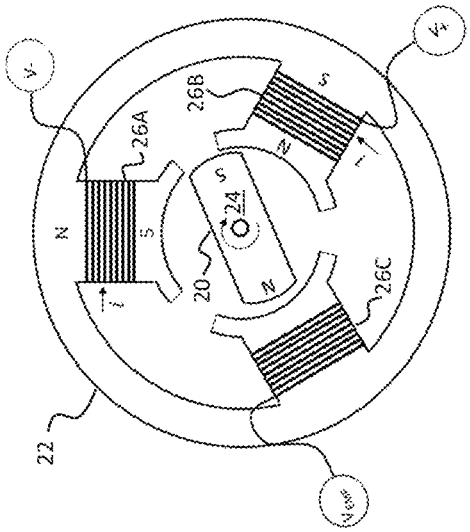

In FIG. 3B, winding 26C may be energized to produce a magnetic field having a south pole at its inner side after the south pole of magnet 24 has passed the middle of winding 26. In this way, the south poles of magnet 24 and winding 26C may repel each other while the north pole of the magnetic field produced by winding 26A attracts the south pole of magnet 24 to promote clockwise rotation of rotor 20. Winding 26B may be de-energized during this stage, and the motion of magnet 24 may induce a current in winding 26B, resulting in a back-EMF in winding 26B. This pattern may be continued through each stage of commutation to sustain rotation of motor 16 in the clockwise direction, as shown in FIGS. 3C-F.

To speed up or slow down the rotation of motor 16, the magnitude of the voltage applied to the energized windings 26A-C (and the corresponding current per Ohm's Law) may be adjusted, for example, in response to a command from motor controller 18. For instance, as the speed of rotor 20 increases, motor controller 18 may have to adjust the commutation timing to switch phases more rapidly in order to achieve smooth and continuous rotational movement of rotor 20 in the proper direction. If motor controller 18 does not quickly respond to changes in the actual speed of motor 16 by appropriately adjusting the commutation timing, e.g., speeding it up or slowing it down in order to maintain or achieve a desired motor speed, situations may arise in which the magnetic fields produced by the energized windings 26A-C can periodically oppose the desired motion of rotor 20, thereby causing jerky or jittery movement of motor 16. In these situations, the torque output of the motor may be intermittently reduced, affecting flight stability of movable object 10.

In some situations, intermittent torque output caused by poor commutation timing can result in insufficient thrust to sustain flight or properly steer movable object 10. In other situations, poor commutation control may result in rotor 20 becoming stuck, which can also result in a loss of thrust and controlled flight. Situations when the torque output of motor 16 is reduced or stopped (e.g., when rotor 20 becomes stuck or is caused to slow down, when commutation control does not smoothly advance rotor movement, etc.) may be referred to as stall events.

Stall events may occur when movements of motor 16 are impeded or prevented. When movement of motor 16 is impeded or prevented, there is a risk that flight control can be reduced or lost or that insufficient thrust is generated to sustain flight, which can result is damage to movable object 10. Additionally, when motor 16 is stalled due to an external influence that prevents motor 16 from moving in response a user's command (i.e., when windings 26AC are energized with current but motor 16 is prevented from moving due to the external influence), windings 26AC can overheat fail or cause damage to other components of moveable object 10.

Thus, it is important for motor controller 18 to accurately know the electrical angle θ of rotor 20 at all times. The electrical angle θ and motor speed n may be indicative of stall events. Knowing the electrical angle θ of motor 16 and the rate of change of the electrical angle θ (or the motor speed n) may allow stall events to be detected and corrected before motor control is affected or damage is caused to motor 16.

Figure 4:
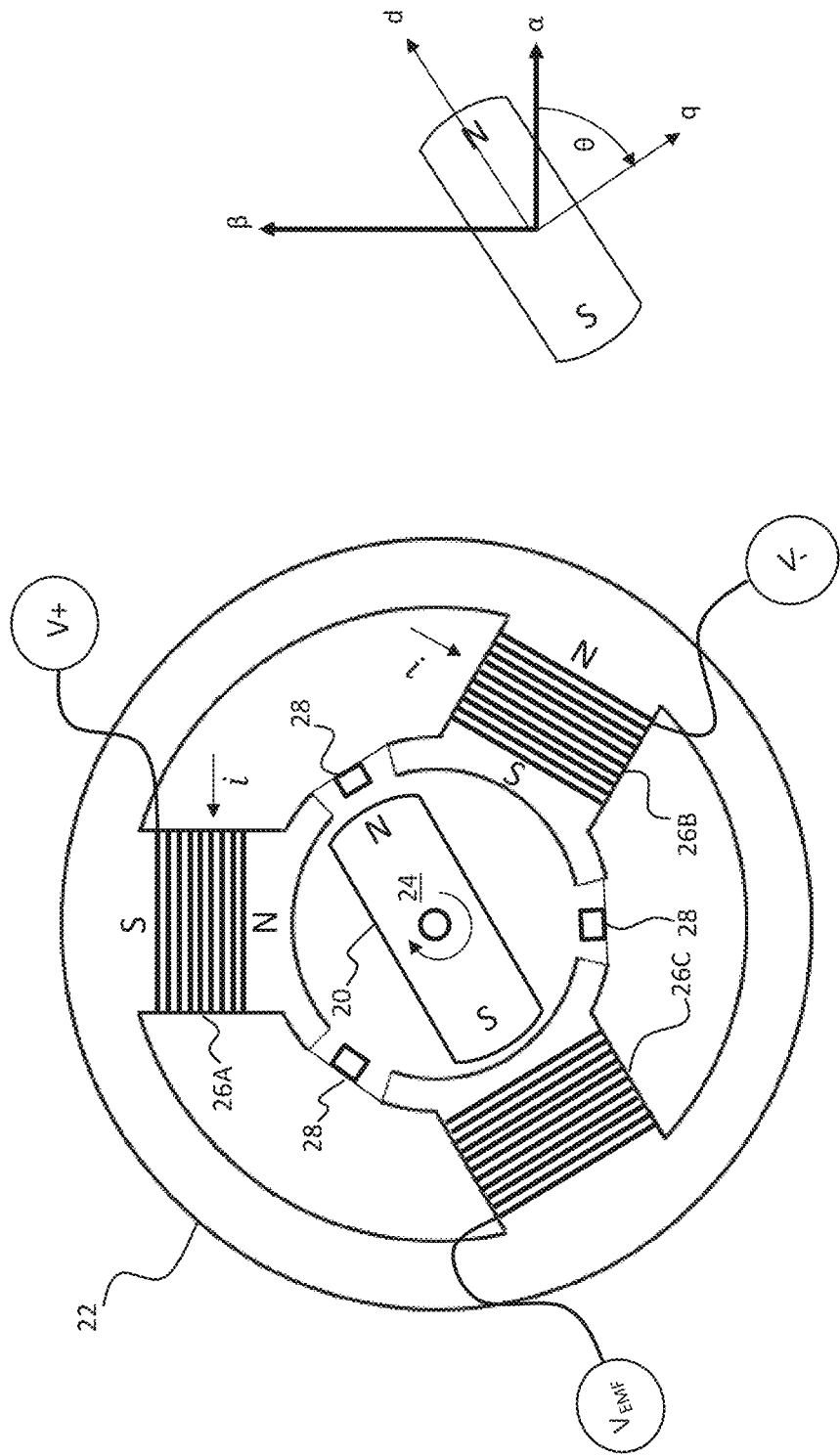
FIG. 4 shows an exemplary brushless motor consistent with embodiments of the present disclosure.

As shown in FIG. 4, to help provide motor controller 18 with information relating to the electrical angle θ of rotor 20, motor 16 may be equipped with one or more position sensors 28 in communication with motor controller 18 (referring to FIG. 1) and configured to generate a signal indicative of the position of rotor 20. For example, position sensors 28 may be Hall Effect sensors configured to detect the magnetic field generated by magnet 24 as it rotates within motor 16. As magnet 24 rotates, position sensors 28 may generate a voltage output based on the magnitude and polarity of the magnetic field associated with the nearest pole of magnet 24.

Although FIG. 4 shows three position sensors 28 (i.e., one between each pair of adjacent windings), it should be understood that more or fewer position sensors 28 may be used. The number of position sensors 28 used within motor 16 may depend on various factors associated with the overall design of motor 16. For instance, the number of position sensors 28 may be selected based on the overall size and weight constraints of motor 16, cost constraints of motor 16, the number of windings within motor 16, the number of electrical phases used to power the windings, and/or other factors. When fewer position sensors are used, the overall cost of motor 16 may be reduced. Further, using fewer sensors requires fewer circuitry components to be used, which allows motor 16 to be lighter, smaller in size, and more robust and reliable (i.e., it may have fewer avenues of potential failure). On the other hand, when more position sensors 28 are used, more position samples may be generated per revolution of rotor 20, thereby improving the accuracy with which motor controller 18 is able to determine motor parameters based on the signals.

Different types of position sensors 28 may be used depending on various factors, such as cost constraints, accuracy requirements, size, weight, reliability, expected ambient conditions, and/or other factors. For example, Hall Effect sensors may be relatively cost effective in comparison to other types of sensors. Hall Effect sensors may also be relatively small, light-weight, and include few parts that are subject to gradual wear, and thus maintain reliability over time. Because Hall Effect sensors operate according to the "Hall Effect," which relies on relationship between magnetic fields and current flowing through a conductor, the output of Hall Effect sensors may be affected by the conditions of their environment, which can lead to inaccurate motor parameter determinations. For example, the performance of Hall Effect sensors can be affected by temperature, which may fluctuate during operation of motor 16 (e.g., due to varying weather conditions, heat generation within windings 26A-C, etc.) and result in varied readings and inconsistent motor parameter determinations. Another influence on the accuracy of Hall Effect sensor readings may include the amount of electromagnetic interference caused by current fluctuations within the electronic components of motor 16. For instance, as windings 26A-C and/or other electrical components and circuits are energized or de-energized with current, magnetic fields generated by each component can create "noise" and interfere with the detection of the rotor position by the Hall Effect sensors. Noise and/or other types of distortion may be intensified as motor 16 is operated at high speeds. At very low speeds, such as when motor 16 is initially started, Hall Effect sensors may be able to effectively determine the position of rotor 20. And if Hall Effect sensors are sufficiently jolted or otherwise physically interfered with to cause misalignment (e.g., due to impact forces, due to misalignment during production or repair, etc.), any determination made based on the Hall Effect sensors can be negatively affected.

Other possible types of position sensors, which may be more costly than Hall Effect sensors, may include optical sensors, electromagnetic resolvers, encoders, giant magnetoresistance sensors (GMR), and/or others. Optical sensors may have higher accuracy and precision characteristics than other types of sensors. They may also be relatively unaffected by ambient conditions. Optical sensors may also include multiple moving parts and occupy more space than other types of sensors. Electromagnetic resolvers may be relatively more accurate in comparison with other types of position sensors, but may also be relatively heavier and occupy more space. Electromagnetic resolvers may include multiple moving parts, but may also be more robust (i.e., damage resistant) in comparison to other types of sensors. GMR sensors may be more costly than Hall Effect sensors but less costly than other types of sensors. GMR sensors may also be relatively robust and include no moving parts. GMR sensors may detect changes in adjacent magnetic fields by observing changes in the electrical resistance of a conductive material caused by the adjacent magnetic field. Similar to Hall Effect sensors, the accuracy and consistency of the output of GMR sensors may be affected by ambient conditions, particularly ambient temperature.

Figure 5:
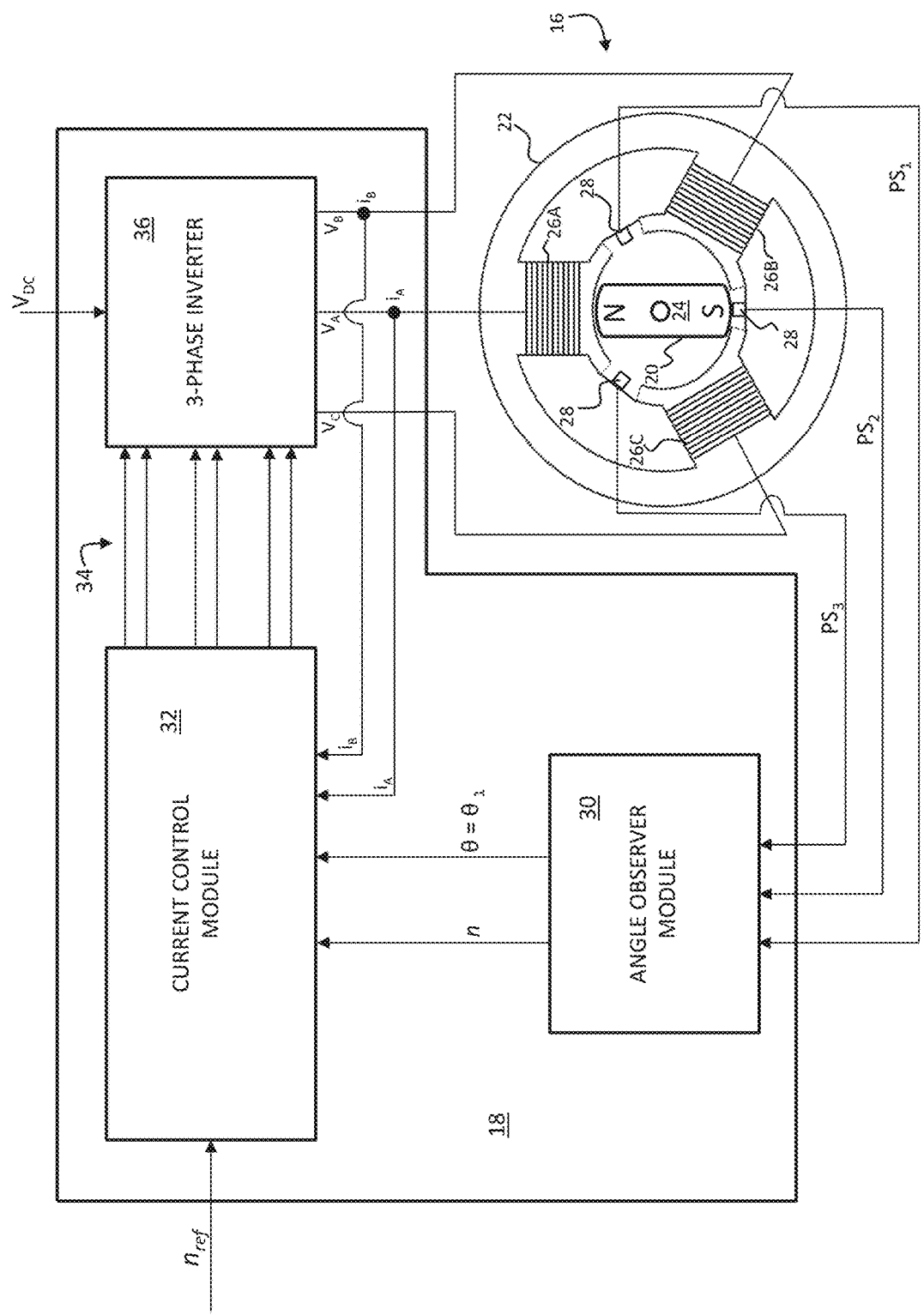
FIG. 5 shows an exemplary control system consistent with embodiments of the present disclosure.

Referring to FIG. 5, position sensors 28 may generate signals $PS_1$, $PS_2$, and $PS_3$ indicative of the location of the location or position of rotor 20. Motor controller 18 may be configured to use one or more of signals $PS_1$, $PS_2$, and $PS_3$ to determine various motor parameters, such as the electrical angle θ of rotor 20, the speed n of rotor 20, and the direction of rotation of rotor 20. When position sensors 28 are Hall Effect sensors, motor controller 18 may be configured to analyze the output of each position sensor 28 to determine when the poles of magnet 24 are near (i.e., perpendicular to, aligned with, in front of, within a distance of, etc.) each position sensor 28.

Angle observer module 30 may be configured to analyze the signals $PS_{1-3}$ to generate a first electrical angle measurement $θ_1$ and determine the rotor speed n of motor 16. The first electrical angle measurement $θ_1$ may refer to measurements of the electrical angle θ determined based on one or more of signals $PS_{1-3}$. Using known information about the geometry of motor 16 (e.g., the distance between adjacent windings 26A-C, the distance between each position sensor 28, the distances from each sensor 28 to adjacent windings 26A-C, and the locations of the α and β axes) and the position of rotor 20 (and thus the position of the d and q axes fixed to rotor 20), angle observer module 30 may be configured to generate the first electrical angle measurement $θ_1$ of rotor 20. Angle observer module 30 may also be configured to track and analyze the amount of time that elapses between each first electrical angle measurement $θ_1$ and use that information to determine the rotor speed n. Based on the rotor speed n and the first electrical angle measurement $θ_1$, angle observer module 30 may also be configured to approximate (e.g., extrapolate) the electrical angle θ when motor 16 is between adjacent position sensors 28.

Angle observer module 30 may output the first electrical angle measurement $θ_1$ and rotor speed n to a current control module 32 in motor controller 18. Current control module 32 may be configured to receive multiple inputs and generate motor control commands 34 based on the inputs. For example, current control module 32 may be configured to receive reference speed signal $n_{ref}$ from an input device (e.g., a remote control device) or from another part of motor controller 18 (e.g., a flight control module). The reference speed signal $n_{ref}$ may be indicative of a desired actual motor speed n to be achieved or maintained by motor controller 18. Current control module 32 may be configured to compare the reference speed signal $n_{ref}$ with the motor speed n determined by angle observer module 30 to determine (e.g., using proportional (P), integral (I), derivative (D), PI or PID control methods) one or more current control reference signals. The current control reference signals may be compared with current measurement signals $i_A$ and $i_B$, which may be indicative of the current being supplied to two energized windings (e.g., 26A and 26B). It should be noted that windings 26A and 26B are mentioned in this discussion for purposes of example and convenience only. Other combinations of windings 26A-C may be energized at different points in time during motor control. The current measurement signals $i_A$ and $i_B$ (two or more current measurements taken from windings 26A-C) may be processed by current control module 32 (e.g., via Clark transformations, Park transformations, comparisons, PI controllers, inverse Park transformations, etc.) in conjunction with the first electrical angle measurement $θ_1$ to generate voltage control signals for energizing windings 26A-C. The voltage control signals may be processed by using a control function, such as pulse width modulation (PWM) controller, to output the motor control commands 34 according to a desired commutation schedule. For example, current control module 32 may be configured to output motor control commands 34 to achieve the motor stages shown in FIGS. 3A-F (discussed above), based on the determined electrical angle θ and rotor speed n. The motor control commands 34 may be input into a three-phase inverter 36 for modulating a DC voltage input to provide current to each of windings 26A-C at different electrical phases according to a desired commutation timing schedule (i.e., to ensure that each winding 26A-C are energized or not energized at proper times pursuant to the commutation schedule).

During operation of motor 16, the electrical angle θ and/or motor speed n determined by angle observer module 30 may be indicative of whether a motor stall event has occurred. For instance, whenever the reference speed $n_{ref}$ is greater than zero (i.e., whenever an operator or motor controller 18 commands propulsion assemblies 12 to be driven), current control module 32 may expect the actual motor speed n to be greater than zero and the electrical angle θ to change in accordance with the motor speed n and/or reference speed $n_{ref}$. Current control module 32 may be configured to compare the actual speed n of motor 16 and reference speed $n_{ref}$ and determine whether motor 16 has slowed or stopped (i.e., stalled) when the difference between the actual rotor speed n and the reference speed $n_{ref}$ is greater than a predetermined threshold, greater than a predetermined threshold for a predetermined period of time, or otherwise indicative of a stall event. For example, current control module 32 may be configured to generate a first rotational speed measurement (e.g., determine rotor speed n based on one or more position sensors or one or more motor electrical parameters), determine a reference speed measurement (e.g., determine reference speed $n_{ref}$), and compare the first rotational speed measurement with the reference speed measurement. When the difference between the first rotational speed (e.g., rotor speed n) and the reference speed (e.g., $n_{ref}$) exceeds a threshold, current control module 32 may determine that a motor stall event has occurred.

Current control module 32 may also or alternatively be configured to compare the current electrical angle $θ_{now}$ (e.g., represented by the first electrical angle measurement $θ_1$) to an anticipated (i.e., future) electrical angle $θ_{next}$ to determine whether a motor stall event has occurred. The anticipated electrical angle $θ_{next}$ may be determined based on an expected change in electrical angle θ over a sample period of time based on the determined motor speed n, the reference speed $n_{ref}$, or a rate of change of the electrical angle θ (i.e., determined separately from the motor speed based on a number of previous angle determinations). After the sample period has elapsed, current control module 32 may determine that a motor stall event has occurred if the current electrical angle $θ_{now}$ is greater than or less than the anticipated electrical angle $θ_{ref}$ by a predetermined threshold, greater than or less than the predetermined electrical angle $θ_{next}$ by a predetermined threshold for a predetermined period of time, or otherwise indicative of a motor stall event.

Figure 6:
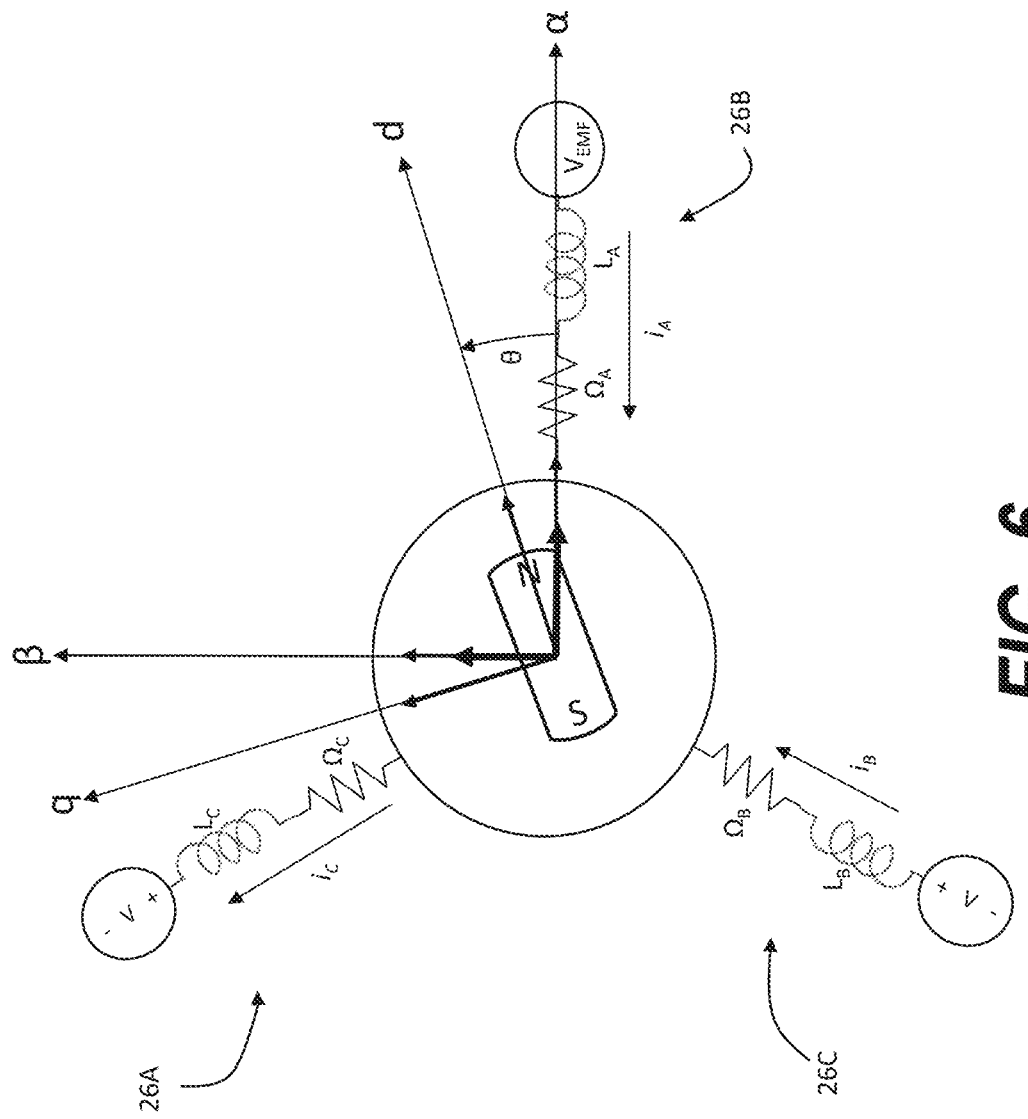
FIG. 6 shows an exemplary axis convention that may be used in sensorless determinations consistent with embodiments of the present disclosure.

Motor controller 18 may also be configured to perform motor commutation and/or detect motor stall events using sensorless methods. That is, angle observer module 30 may be configured to determine the electrical angle θ and/or speed n of motor 16 without information received position sensors 28. For example, as shown in FIG. 6A, several electrical parameters may be known, measurable, and/or determinable that may be indicative of other motor parameters. Each winding 26A-C may be associated with a respective "phase" of electrical power as well as its own corresponding electrical parameters. Thus, the electrical parameters associated with each winding 26A-C may be associated with a respective phase. In other words, electrical parameters (e.g., current, voltage, resistance, inductance, etc.) may be referred to as "phase parameters" (e.g., phase current, phase voltage, phase resistance, phase inductance, etc.). In some embodiments, current $i_{A-C}$ of each winding 26A-C may be measured or otherwise determined. Voltage $V_{A-C}$ of each winding may be measured or determined based on current $i_{A-C}$ and known values of resistance $A_{A-C}$ for each winding 26A-C (e.g., based on Ohm's Law). Inductance $L_{A-C}$ may be determined based on voltage $V_{A-C}$ and changes in current $i_{A-C}$ over time and/or other known information.

Figure 7A:
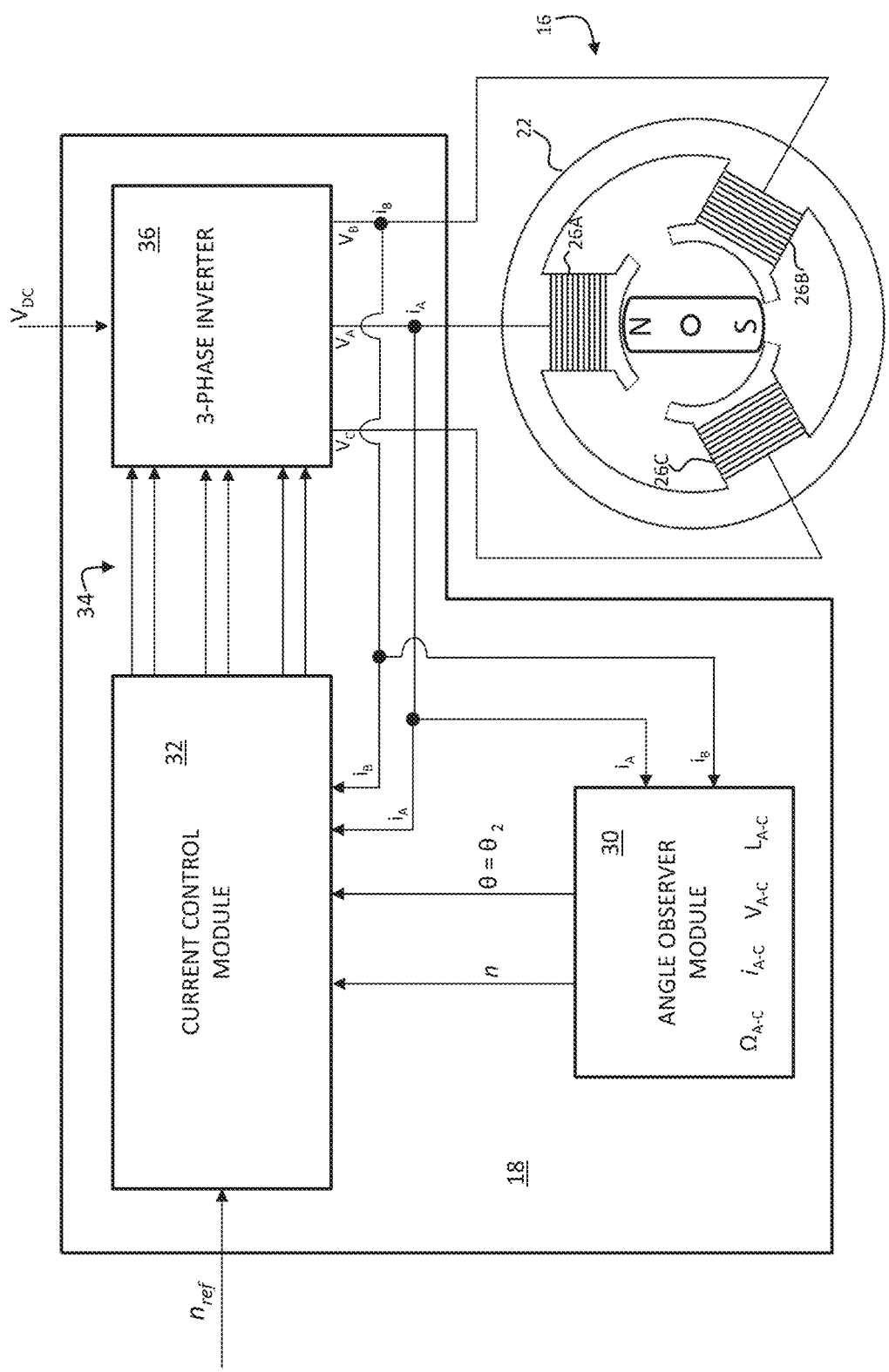
FIG. 7A shows an exemplary control system consistent with embodiments of the present disclosure.

As shown in FIG. 7A, measured parameters, such as current $i_{A-C}$, as well as other parameters (e.g., $V_{A-C}$, $Ω_{A-C}$, $L_{A-C}$, and/or others) may be provided as inputs to or otherwise determined by angle observer module 30 and/or current control module 32. Angle observer module 30 may be configured to determine a second electrical angle $θ_2$ and/or the motor speed n based on the motor parameters using angle and speed determination algorithms according to a desired determination strategy. The second electrical angle measurement $θ_2$ may refer to measurements of the electrical angle θ performed using a sensorless detection method. Various sensorless detection methods may be used, such as sliding-mode observer (SMO) methods, extended Kalman filter (EKF) methods, model reference adaptive system (MRAS) methods, adaptive observers, and/or artificial neural networks (ANN). Such methods may involve measuring one or more of the current $i_{A-C}$ and/or voltage $V_{A-C}$ of windings 26A-C and/or determining one or more of the winding inductance $L_{A-C}$, back-EMF, rotor magnetic flux, and/or other parameters. It is noted that other sensorless algorithms may be used.

Angle observer module 30 may output the second electrical angle measurement $θ_2$ and the rotor speed n to current control module 32 in motor controller 18. Current control module 32 may be configured to compare the reference speed signal $n_{ref}$ with the motor speed n determined by angle observer module 30 to determine one or more current control reference signals. The current control reference signals may be compared with current measurement signals $i_A$ and $i_B$, which may be indicative of the current being supplied to the two energized windings (e.g., 26A and 26B). The current measurement signals $i_A$ and $i_B$ may be processed by current control module 32 (e.g., via Clark transformations, Park transformations, comparisons, PI controllers, inverse Park transformations, etc.) in conjunction with the second electrical angle measurement $θ_2$ to generate voltage control signals for energizing windings 26A-26C. Various sensorless motor control methods may be used, such as back-EMF zero crossing detection methods, third harmonic voltage integration methods, free-wheeling diode conduction detection methods, and back-EMF integration methods. It should be noted the present disclosure is not limited to these methods, and other sensorless control methods may be used.

Figure 7B:
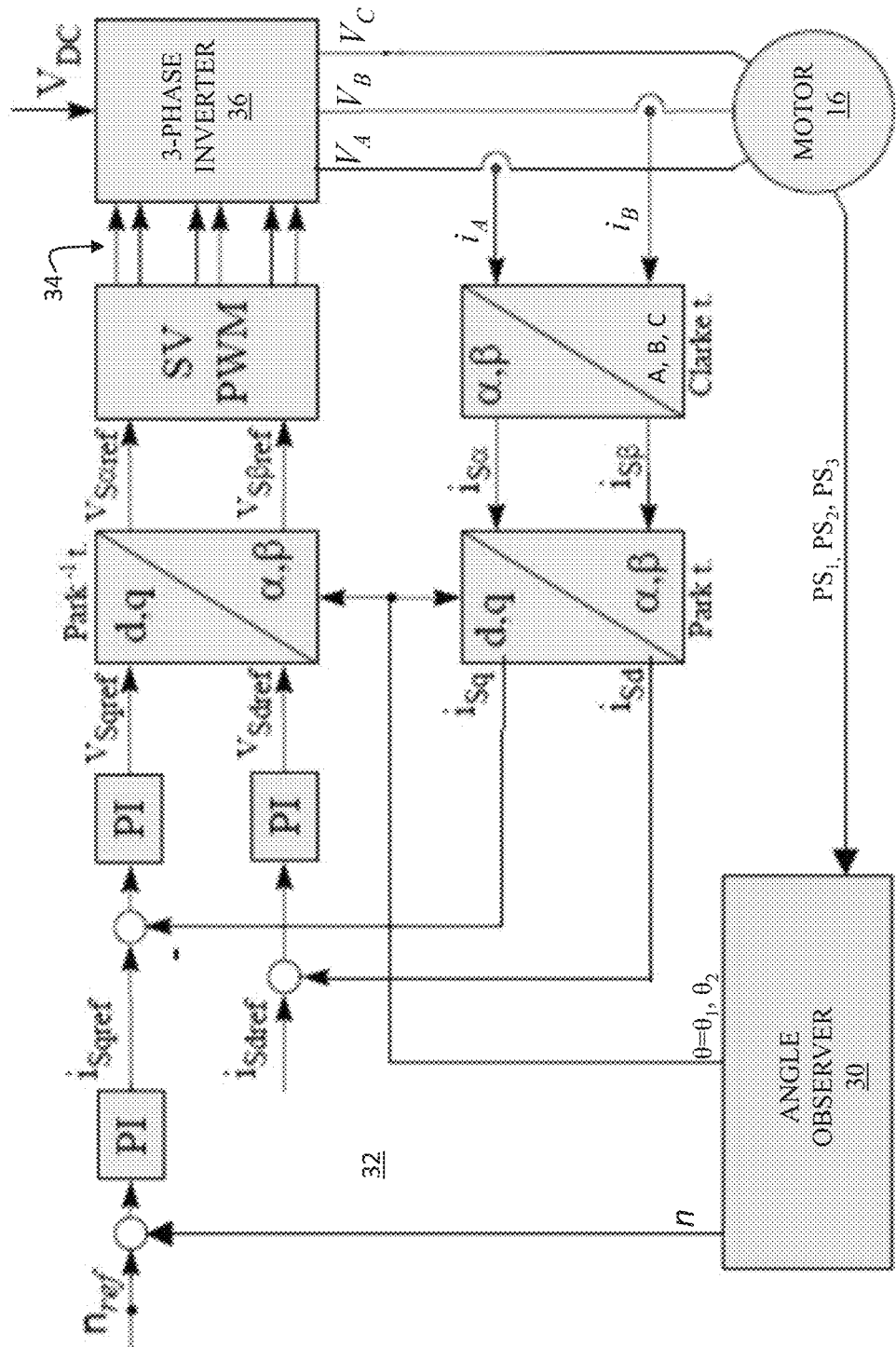
FIG. 7B shows an exemplary current control module consistent with embodiments of the present disclosure.

FIG. 7B shows an exemplary control structure of current control module 32. In the example of FIG. 7B, voltages $V_A$, $V_B$, $V_C$ and currents $i_A$, $i_B$ (any two current measurements of windings 26A-C) may be measured or otherwise determined based on the properties of windings 26A-C. The three-phase currents $i_A$, $i_B$, $i_C$ (only $i_A$ and $i_B$ are shown because current in one of the windings, i.e., $i_C$ is zero) may be translated from the three-phase reference frame (indicated by subscripts $_A$, $_B$, and $_C$ in FIG. 6) to the two-axis orthogonal stationary reference frame (indicated by α and β axes in FIG. 6) as stationary two-phase currents $i_{Sα}$ and $i_{Sβ}$ (which may be referred to as α-axis actual current and β-axis actual current, respectively) using a Clarke transformation. The stationary two-phase currents $i_{S\alpha}$ and $i_{S\beta}$ may be translated into the orthogonal moving (i.e., rotating) reference frame (indicated by d and q in FIG. 6) as moving two-phase currents $i_{Sd}$ and $i_{Sq}$ (which may be referred to as d-axis actual current and q-axis actual current, respectively) using a Park transformation. In this way, three-phase electrical parameters (e.g., $i_{A-C}$, $V_{A-C}$, $L_{A-C}$, $\Omega_{A-C}$, etc.) may be translated into corresponding moving two-phase electrical parameters (e.g., $i_{Sd}$, $V_{Sd}$, $L_{Sd}$, $\Omega_{Sd}$, $i_{Sq}$, $V_{Sq}$, $L_{Sq}$, $\Omega_{Sq}$, etc.). The moving two-phase currents $i_{Sd}$ and $i_{Sq}$ may be compared to a d-axis current target value $i_{Sdref}$ and a q-axis current target value $i_{Sqref}$, respectively, in feedback control (e.g., using PI control), to generate a d-axis voltage target value $V_{Sdref}$ and a q-axis voltage target value $V_{Sqref}$. Using an inverse Park transformation, the d-axis voltage target value $V_{Sdref}$ and a q-axis voltage target value $V_{Sqref}$ may be transformed back into the stationary reference frame as α-axis target voltage $V_{S\alpha ref}$ and β-axis target voltage $V_{S\beta ref}$, respectively, and processed using a control function, such as pulse-width modulation (PWM), to produce motor control commands 34 as inputs for three-phase inverter 36, which drives motor 16.

The PWM control function may be selected based on a desired motor commutation schedule (e.g., based on the geometry of motor 16). For example, current control module 32 may be configured to output motor control commands 34 to achieve the motor stages shown in FIGS. 3A-F (discussed above), based on the second electrical angle measurement $\theta_2$, the rotor speed n, and a selected sensorless control method (e.g., algorithm, model, etc.). The motor control commands 34 may be input into a three-phase inverter 36 for modulating a DC voltage input VDC for energizing windings 26A-C.

During operation of motor 16, the electrical angle θ and/or motor speed n determined by angle observer module 30 using sensorless methods may be indicative of whether a motor stall event has occurred. For instance, similar techniques to those discussed above using the first electrical angle measurement $\theta_1$ to detect motor stall events may be performed using the second electrical angle measurement $\theta_2$. Other stall determination techniques may also be use, such as by current sensing methods and back-EMF determination methods. For example, even when windings 26A-C are energized during operation of motor 16, a back-EMF may be generated in each winding 26A-C whenever magnet 24 is rotating. The back-EMF may oppose the voltage input supplied by inverter 36, thereby changing the voltage potential $V_{A-C}$ and (by Ohm's law) the current $i_{A-C}$ associated with each winding 26A-C. In some embodiments, the current $i_{A-C}$ may be measured and analyzed for determining motor stall conditions. For instance, when motor 16 stalls, no back-EMF is generated, and thus the voltage $V_{A-C}$ associated with each coil may be about equal to, proportional to, or otherwise determinable based on the voltage input (e.g., a bus voltage or supply voltage) received from inverter 36. Because the input voltage is not opposed, the current $i_{A-C}$ associated with each winding 26A-C may suddenly increase (per Ohm's law). Measured current values $i_{A-C}$ may be monitored and analyzed to determine when motor stall conditions (e.g., current changes beyond a threshold value and/or which last more than a threshold amount of time) that indicate a motor stall event has occurred. Alternatively, the back-EMF may be directly monitored and analyzed to determine when motor stall conditions (e.g., voltage changes beyond a threshold value and/or which last more than a threshold amount of time).

In some situations, sensorless commutation and position determination methods may not be sufficiently accurate to achieve a desired quality of motor operation. That is, motor parameter determinations can be inaccurate at times, which can have adverse effects on of the second electrical angle measurement $\theta_2$ and motor speed n determinations and thus on motor commutation. For instance, sensorless methods that rely on current and voltage sensing and/or determination techniques can be rendered inaccurate or inconsistent when ambient conditions fluctuate (e.g., ambient temperature). That is, as temperature changes, resistance in windings 26A-C may change, which can significantly affect current and voltage determinations. Also, if the input or bus voltage supplied to windings 26A-C is inconsistent (e.g., due to voltage changes in a battery or other voltage source), current and/or voltage determinations may be rendered inaccurate. Also, since back-EMF is zero when motor 16 is at a stop and proportional to motor speed n, electrical angle θ and motor speed n determinations may be diminished or obscured by commutation noise or other interferences during operation at low speeds. At high motor speeds, less time may be available for measurements or calculations of electrical angle θ and rotor speed n. Thus, the use of filtering and/or other signal conditioning or processing techniques associated with some sensorless control methods that cannot be completed at high motor speeds before the next commutation cycle passes can result in inaccurate second electrical angle measurements $\theta_2$ and rotor speed n determinations.

Figure 8:
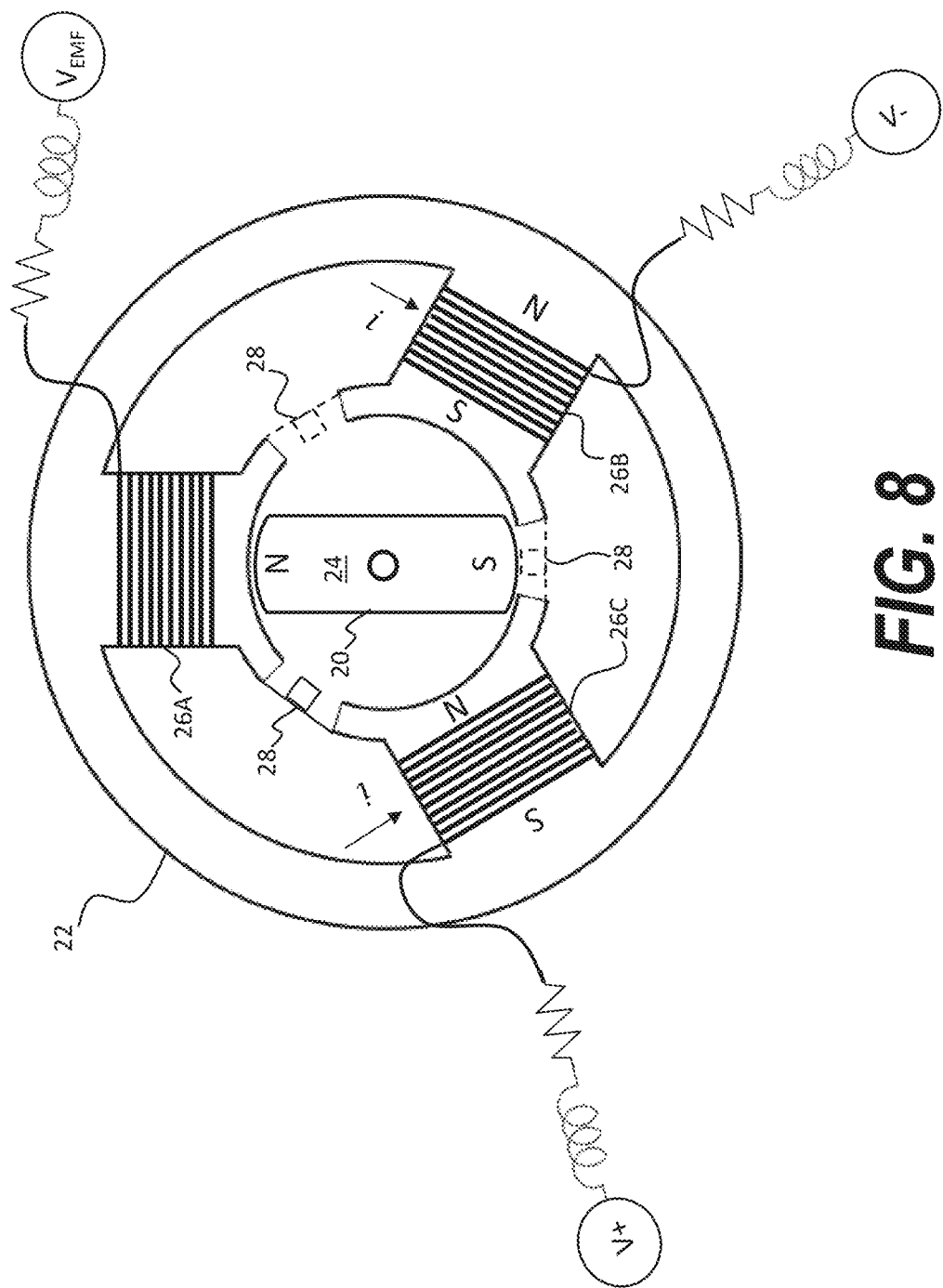
FIG. 8 shows an exemplary brushless motor consistent with embodiments of the present disclosure.

In order to allow for continued operation of motor 16 at wide speed ranges, under varying ambient conditions, and in the event movable object 10 sustains damaging impacts, motor 16 may be equipped with at least one position sensor 28 as well as equipment for performing sensorless motor control. For example, as shown in FIG. 8, motor 16 may include only one position sensor 28 in addition to being configured to carry out sensorless control (e.g., in conjunction with functions of motor controller 18, discussed below). Incorporating only one position sensor may provide a low-cost solution to provide supplemental and/or redundant features for determining electrical angle θ and motor speed n. In some embodiments, the one position sensor 28 may be a Hall Effect sensor, which may further reduce the cost of motor 16 while providing additional information about the operations of motor 16. It should be noted that any other type of position sensor, such as those discussed above, may be used. In other embodiments, multiple (i.e., a plurality of) position sensors may be included to provide redundant and/or supplemental information in combination with sensorless control features. As shown in FIG. 8, position sensors 28 shown in phantom lines may indicate alternative positions for a single sensor or locations where additional sensors may be located. It should be noted that other locations and/or configurations of position sensors 28 may be possible.

Figure 9:
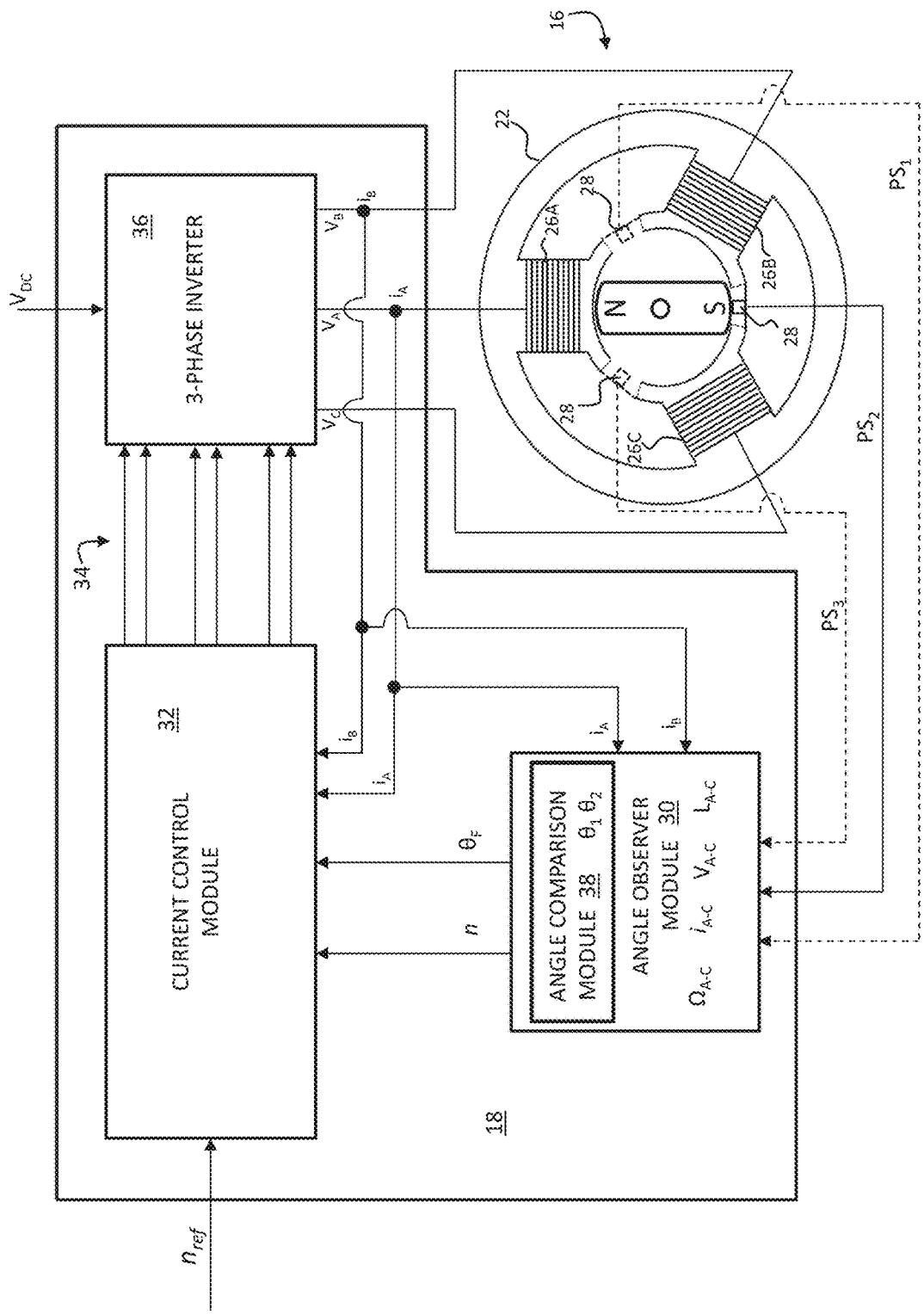
FIG. 9 shows a diagrammatic illustration of a control system consistent with embodiments of the present disclosure.

As shown in FIG. 9, motor 16 may include at least one position sensor 28 (i.e., only one, a plurality, etc.) configured to provide one or more position sensor signals $PS_{1-3}$ to motor controller 18 as similarly explained above. Lines shown in phantom may indicate alternative positions of the at least one position sensor 28 and associated connections to motor controller 18 or the locations of additional sensors (i.e., of a plurality of sensors) and associated connections. Motor controller 18 may also be configured to perform sensorless determinations of electrical angle θ and rotor speed n and/or sensorless commutation (i.e., motor 16 may include sensory devices, circuitry, and or other equipment for communicating motor parameters to motor controller 18) as similarly explained above. Motor controller 18 may further include an angle comparison module 38 configured to compare a first electrical angle measurement $\theta_1$ with the second electrical angle measurement $\theta_2$ and facilitate a selection or modification of one of the electrical angle measurements for purposes of determining a final electrical angle $\theta_F$ to be used for motor control, which will be explained in further detail below.

Figure 10:
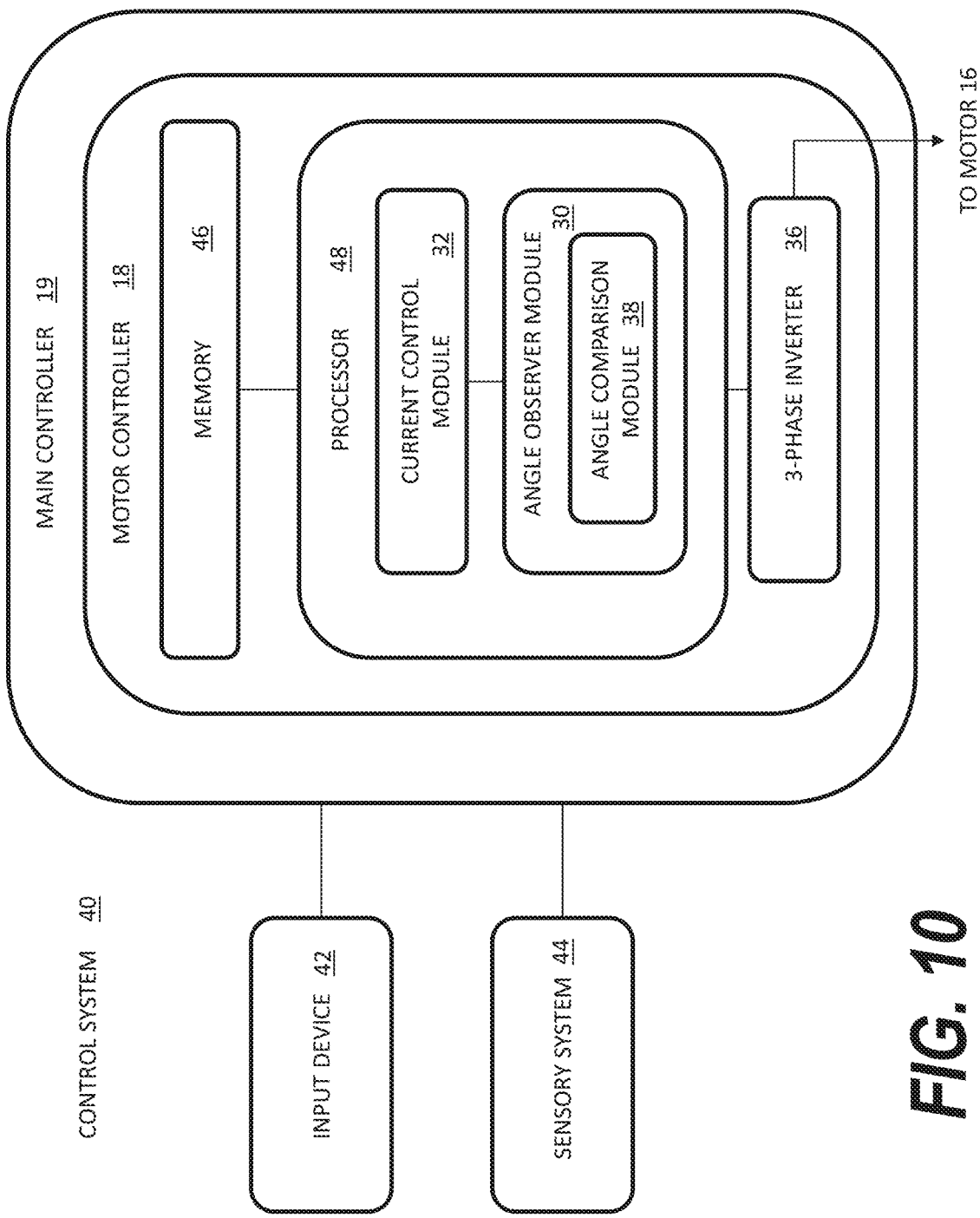
FIG. 10 shows a schematic and diagrammatic illustration of a control system consistent with embodiments of the present disclosure.

FIG. 10 shows an exemplary control system 40 consistent with embodiments of this disclosure. Control system 40 may include main controller 19, motor controller 18, an input device 42, and a sensory system. Input device 42 may be or include one or more user-operated controllers (e.g., a remote control device) and/or other controllers control modules. Input device 42 may be configured to provide input signals for operating movable object 10. For instance, input device may be configured to generate one or more input signals indicative of a desired speed, rotational direction, or orientation of propulsion assemblies 12 of movable object. Input signals generated by input device 42 may be indicative of or may be used to generate reference signals, such as reference speed $n_{ref}$. Input device 42 may be configured to communicate electronically with motor controller 18, for example, via a wireless or wired communication connection.

Sensory system 44 may include one or more sensors (e.g., position sensors 28) positioned internally and/or externally of motor 16 and configured to generate sensory signals for determining the first electrical angle measurement $\theta_1$, rotor speed n, and/or other control parameters associated with motor 16. For instance, sensory system may include position sensors 28, current sensors, voltage sensors, temperature sensors, vibration sensors, shock (i.e. impact) sensors, timers, and/or other sensors. Sensory system 44 may be configured to communicate electronically with main controller 19 and/or motor controller 18 via one or more wireless or wired communication connections.

Main controller 19 may include one or more processors, memories, circuits, and/or other components configured to support and/or carry out functions of movable object 10. Main controller 19 may be a single controller or include multiple controllers or control modules that operate separately or together. Main controller 19 may be, for example, a flight controller configured to control one or more flight operations of movable object 10. For example, main controller 19 may be configured to control vertical, roll, pitch, and/or yaw movements of movable object 10. Main controller 19 may also or alternatively be configured to control flight tracking (e.g., target tracking) functions of movable object 10 using automated flight controls. In some embodiments, components of main controller 19 may include motor controller 18 and/or other controllers or control modules. That is, motor controller 18 may be a part of or make up a portion of main controller 19. In other embodiments, main controller 19 may be separate from and in communication with motor controller 18.

Main controller 19 may also or alternatively be a general controller configured to control various functions of movable object 10. For example, main controller 19 may be configured to control communication functions, emitted signals (e.g., via lights, sounds, etc.), and/or other systems, such as sensory systems, remote control systems (e.g., for a user terminal), and/or auxiliary systems. Auxiliary systems may include devices such as cameras, tracking systems, cargo systems, tools, etc.

Motor controller 18 may include one or more components, for example, a memory 46 and at least one processor 48. Memory 46 may be or include non-transitory computer readable medium and can include one or more memory units of non-transitory computer-readable medium. Non-transitory computer-readable medium of memory 46 may be or include any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Memory units may include permanent and/or removable portions of non-transitory computer-readable medium (e.g., removable media or external storage, such as an SD card, RAM, etc.).

Information and data from other areas of motor controller 18, input device 42, and sensory system 44 may be communicated to and stored in non-transitory computer-readable medium of memory 46. Non-transitory computer-readable medium associated with memory 46 may also be configured to store logic, code and/or program instructions executable by processor 48 to perform any suitable embodiment of the methods described herein. For example, non-transitory computer-readable medium associated with memory 46 may be configured to store computer-readable instructions that, when executed by processor 48, cause the processor to perform a method comprising one or more steps. The method performed by the processor based on the instructions stored in the non-transitory computer readable medium may involve processing inputs, such as inputs of data or information stored in the non-transitory computer-readable medium of memory 46, inputs received from input device 42, inputs received from sensory system 44 (e.g., received directly from sensors or retrieved from memory), and/or other inputs. The non-transitory computer-readable medium may be configured to store sensing data from sensory system 44 and/or input device 42 to be processed by processor 48. In some embodiments, the non-transitory computer-readable medium can be used to store the processing results produced by processor 48.

Processor 48 may include or more processors and may embody a programmable processor (e.g., a central processing unit (CPU). Processor 48 may be operatively coupled to memory 46 or another memory device configured to store programs or instructions executable by processor 48 for performing one or more method steps. It is noted that method steps described herein may be stored in memory 46 and configured to be carried out by processor 54 to cause the method steps to be carried out by the processor 48.

In some embodiments, processor 48 may include and/or alternatively be operatively coupled to one or more control modules, such as angle observer module 30, current control module 32, and angle comparison module 38, which will be explained in greater detail below. Translation module 56 may be configured to control methods of translating information, such as inputs, command, and other signals, from one perspective (e.g., a perspective of the user, a perspective of the movable object 10, etc.) to another perspective (e.g., another of the perspective of the user, the movable object 10, or another perspective). Tracking control module 58 may be configured to help control propulsion assemblies 12 of movable object 10 to adjust the spatial disposition, velocity, and/or acceleration of the movable object 10 with respect to six degrees of freedom (e.g., there translational directions along its coordinate axes and three rotational directions about its coordinate axes). Angle observer module 30, current control module 32, and angle comparison module 38 may be implemented in software for execution on processor 48, as illustrated in FIG. 10, or may be implemented in hardware or software components separate from processor 48 (not shown in the figure).

The components of motor controller 18 can be arranged in any suitable configuration. For example, one or more of the components of the motor controller 18 can be located on the movable object 10, on an associated carrier, in a payload, within input device 42, within sensory system 44, or within an additional external device in communication with one or more of the above. In some embodiments, one or more processors or memory devices can be situated at different locations, such as on the movable object 10 and/or a suitable off-board location, such that any suitable aspect of the processing and/or memory functions performed by the system can occur at one or more of the aforementioned locations.

Figure 11:
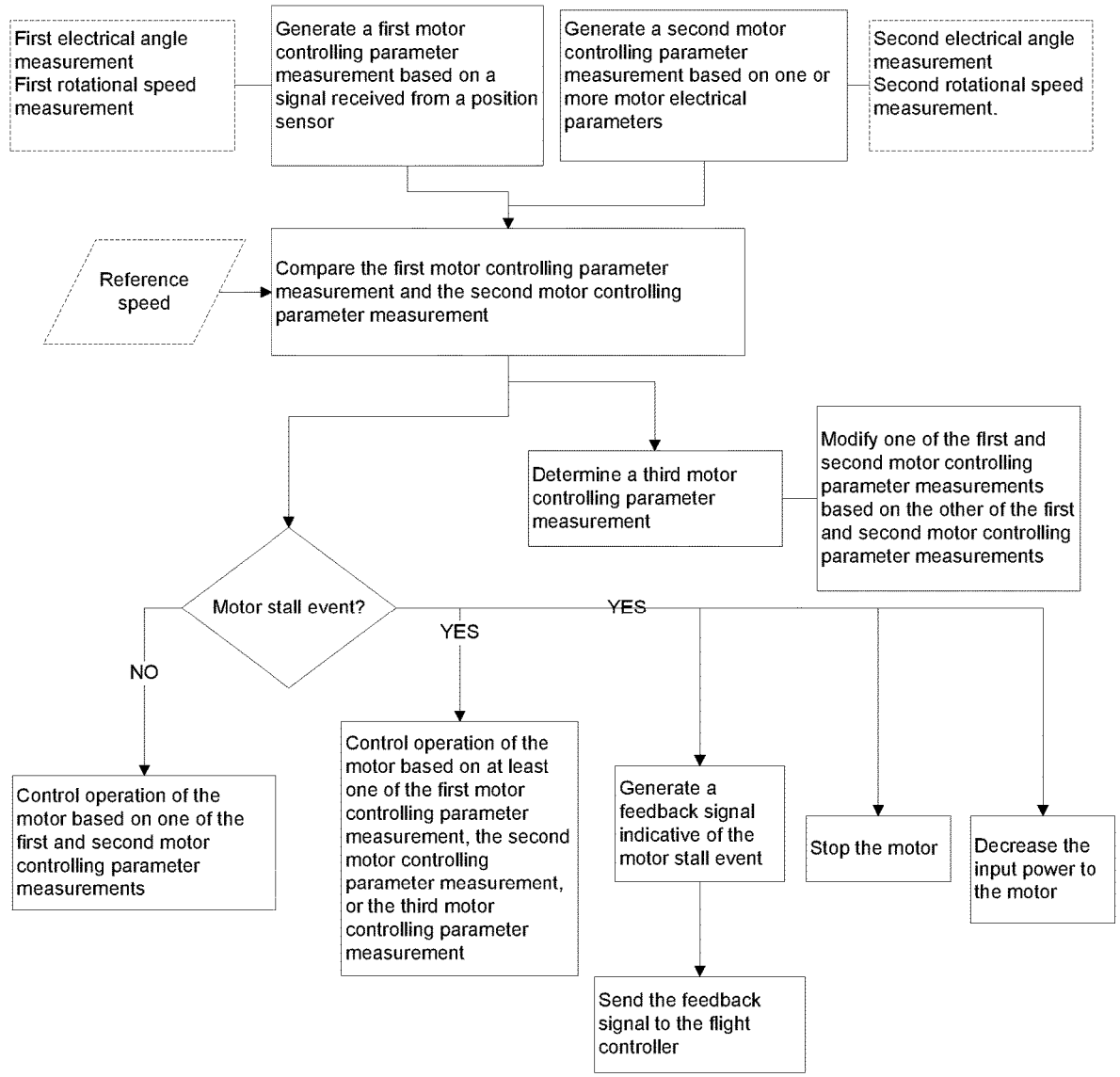
FIG. 11 shows a flow chart of a control system consistent with embodiments of the present disclosure.

With reference to FIGS. 9, 10, and 11, control system 40 may be configured to control various aspects of motor 16, such as motor commutation timing and rotational speed for achieving and/or maintaining desired flight characteristics of movable object 10 (referring to FIG. 1). During operation of motor 16, motor controller 18 may be configured to determine the first electrical angle $\theta_1$ based one or more signals $PS_{1-3}$ (e.g., one signal, a plurality of signals, etc.) received from one or more position sensors 28 (e.g., one sensor 28, a plurality of sensors 28, etc.). The signals $PS_{1-3}$ may be communicated to angle observer module 30, and angle observer module 30 may then determine the first electrical angle $\theta_1$ based on the signals $PS_{1-3}$. Motor controller 18 may also be configured to determine the second electrical angle measurement $\theta_2$ based on detected motor electrical parameters. For instance, the current $i_{A-C}$, voltage $V_{A-C}$, inductance $L_{A-C}$, and/or resistance $\Omega_{A-C}$ of windings 26A-C may be measured or otherwise determined as described above and communicated to angle observer module 30. Angle observer module 30 may then determine the second electrical angle $\theta_2$ based on the determined motor parameters (i.e., using sensorless determination methods described above).

Angle comparison module 38 may be configured to then determine a third electrical angle measurement $\theta_3$. The third electrical angle measurement $\theta_3$ may be based on the first and second electrical angle measurements $\theta_1$ and $\theta_2$. For instance, the third electrical angle measurement $\theta_3$ may be determined, by modifying one of the first and second electrical angle measurements $\theta_1$, $\theta_2$ with the other or combining them mathematically. For example, the third electrical angle measurement $\theta_3$ may be determined by averaging the first and second electrical angle measurements $\theta_1$, $\theta_2$, increasing or decreasing one of the first or second electrical angle measurements $\theta_1$, $\theta_2$ based on a difference between them (e.g., based on a value difference or percent difference), or performing a different type of mathematical procedure (e.g., involving an algorithm, model, equation, or formula) using both electrical angle measurements $\theta_1$, $\theta_2$ in order to determine the third electrical angle measurement $\theta_3$. When the first and second electrical angle measurements $\theta_1$, $\theta_2$ are similar, the third electrical angle measurement $\theta_3$ may be the same or relatively similar to each of the first and second electrical angle measurements $\theta_1$, $\theta_2$. When the first and second electrical angle measurements $\theta_1$, $\theta_2$ are dissimilar, the third electrical angle measurement $\theta_3$ may be dissimilar to one or both of the first and second electrical angle measurements $\theta_1$, $\theta_2$ (e.g., depending on the method used to determine the third electrical angle measurement $\theta_3$) but may be closer to the true electrical angle $\theta$ of motor 16 than one or both of the first and second electrical angle measurements $\theta_1$, $\theta_2$.

Angle comparison module 38 may be configured to then select one of the first, second, and third electrical angle measurements $\theta_{1-3}$ for use in controlling motor 16. Angle comparison module 38 may first compare the first and second electrical angle measurements $\theta_1$, $\theta_2$ to determine whether they are different. When they are not different (or if their difference is within a threshold difference), angle comparison module 38 may select either of the first or second electrical angle measurements $\theta_1$, $\theta_2$. Selection of the first or second electrical angle measurements $\theta_1$, $\theta_2$ when they are not different (or their difference is does not exceed a threshold) may be made independently of other parameters, such as the motor speed n, ambient temperature, input voltage, and/or other factors. When the first and second electrical angle measurements $\theta_1$, $\theta_2$ are different (e.g., when their differences exceeds a threshold), angle comparison module 38 may then analyze other motor parameters and/or ambient conditions to determine whether the current operating conditions of motor 16 are more suitable for relying on position sensors 28 or sensorless methods for determining the electrical angle $\theta$. For example, at low speeds and acceptable temperatures, angle comparison module 38 may be configured to select the first electrical angle measurement $\theta_1$ based on the readings from position sensors 28. At high speeds and acceptable temperatures, angle comparison module 38 may be configured to select the second electrical angle measurement $\theta_2$ based on the motor parameters (e.g., the electrical parameters). When operating conditions are not ideal for relying exclusively on either the first or second electrical angle measurements $\theta_1$, $\theta_2$, such as when temperatures are high or are rapidly fluctuating, when excessive noise or interferences is obscuring both determinations, or at very high motor speeds, angle comparison module may select the third electrical angle measurement $\theta_3$ to reduce a likelihood or impact of relying on an inaccurate measurement of the electrical angle $\theta$ and motor speed n.

Referring still to FIGS. 9,10, and 11, during operation of motor 16, motor controller 18 may be configured to determine whether a motor stall event occurred based on the detected motor parameters (e.g., electrical parameters) and the signals from position sensors 28 (or single position sensor 28). For example, motor stall conditions indicative of motor stall events may be determined in the manner discussed above using both sensorless methods as well as position sensors 28. When a motor stall condition is determined by one of the sensorless method or based on position sensors 28, the other of the sensorless method and the position sensors 28 may be used to validate the motor stall condition determination. For example, when motor controller 18 determines that a motor stall condition has occurred based on detected motor parameters (e.g., electrical parameters), motor controller 18 may validate or confirm this determination by checking whether the signals $PS_{1-3}$ generated by one or more of position sensors 28 indicate that motor 16 is not actually stalled (i.e., that it is still moving). In this way, sudden increases in motor current $i_{1-3}$ that may appear to indicate that motor a motor stall condition has occurred can be quickly confirmed or denied as being attributable to an actual stall condition or to another phenomenon, such as receipt of a sudden command for high acceleration, sudden change in the actual rotor speed n, or sudden load variations on motor 16.

For example, current control module 32 may be configured to generate a first rotational speed measurement based on the detected motor electrical parameters (e.g., using a sensorless method). Current control module may also determine a second rotational speed measurement based on the signal received from one or more position sensors. Current control module may be configured to then compare the first rotational speed measurement with the second rotational speed measurement to determine whether a motor stall condition has occurred. When the difference between the first rotational speed measurement and the second rotational speed measurement exceeds a threshold, current control module 32 may determine that a motor stall event has occurred.

When the current increase is not attributable to an actual stall event, motor control and commutation should continue according to prevent a sudden loss of control of the flight of movable object 10. When the current increase is attributable to an actual stall event, motor controller 18 may be configured to take protective measures, such as limiting the voltage applied to windings 26A-C, attempting to cure the stall condition (e.g., resetting motor operations, decreasing a power output of the motor, etc.), or switching to a different method of determining the electrical angle θ and rotor speed n. When the motor stall even is determined to have been eliminated, controller 18 may increase the power output of the motor and/or permit the power output of the motor to be increased in accordance with normal operating control procedures.

For instance, when a motor stall event is determined not to have occurred, such as when a current spike may be attributed to an event other than a motor stall event upon confirmation based on the signals generated by position sensors 28, motor controller 18 may be configured to continue controlling operation of motor 16 using the initially selected electrical angle measurement $\theta_{1-3}$. When a current spike or other motor stall condition is attributed to a motor stall event (i.e., when a motor stall even is determined to have occurred), motor controller 18 may be configured to select a different one of the electrical angle measurements $\theta_{1-3}$ based on the methods described above and control subsequent operations of motor 16, including commutation, based on the subsequently selected one of the electrical angle measurements $\theta_{1-3}$. In this way, if operating conditions should change (i.e., ambient conditions or internal motor conditions) or if position sensors 28 or the sensorless equipment should fail during flight, the other of the position determination systems may be available as a redundant system to allow adequate control of movable object 10 to be maintained. This may allow movable object 10 to be controlled with a reduced likelihood of potential loss of control and/or incurred damage as a result of varying ambient conditions and/or other operational conditions. It should be understood that motor stall conditions based on current may also or alternatively be based on voltage.

In some embodiments, motor controller 18 and/or main controller 19 may be configured to control motor 16 by determining whether a first motor controlling parameter (e.g., a measurement of the electrical angle θ, a motor speed n, etc.) is abnormal and controlling motor 16 using a second motor controlling parameter (e.g., a second measurement of the electrical angle or a second motor speed, etc.) when the first motor controlling parameter is abnormal. For example, the first motor controlling parameter may be a motor control parameter determined based on motor electrical parameters, e.g., a sensorless measurement of the electrical angle θ (e.g., $\theta_2$) or motor speed n. Motor electrical parameters may include currents ($i_{A-C}$, $i_{S\alpha}$, $i_{S\beta}$, $i_{Sd}$, $i_{Sq}$, $i_{Sdref}$, $i_{Sqref}$ etc.), voltages ($V_{A-C}$, $V_{Sd}$, $V_{Sq}$, $V_{Sdref}$, $V_{Sqref}$, $V_{S\alpha ref}$, $V_{S\beta ref}$), inductances ($L_{A-C}$, $L_{Sd}$, $L_{Sq}$, etc.), and/or resistances ($\Omega_{A-C}$, $\Omega_{Sd}$, $\Omega_{Sq}$, etc.). Motor electrical parameters may also include temperatures, such as the ambient temperature, the temperature of one or more windings 26A-C, or an internal temperature of motor 16, which can affect or relate to other electrical parameters.

The first motor control parameter may be determined to be abnormal when a motor electrical parameter is outside of a predetermined range. For example, each motor electrical parameter may be associated with a predetermined range of values that is associated with operations under certain conditions. When one or more electrical parameters is determined to be outside of the predetermined range or threshold for a given set of operating conditions, the first motor control parameter may be determined to be abnormal. In some embodiments, the predetermined range or threshold may be a value or range of values or a percentage or range of percentages of a predetermined or expected value.

When the first motor control parameter is determined to be abnormal, the second motor controlling parameter measurement may be generated and used to control motor 16. The second motor controlling parameter measurement may be a measurement of the electrical angle θ or the motor speed n that is made based on a signal (e.g., $PS_1$, $PS_2$, $PS_3$, etc.) received from one or more position sensors (e.g., position sensors 28). For example, during low speed or extreme temperature (e.g., high or low) operation of motor 16, measurements of the electrical angle θ and the motor speed n determined using a sensorless method may be abnormal. When measurements of the electrical angle θ and the motor speed n are determined to be abnormal, motor 16 may be controlled based on measurements of the electrical angle θ and the motor speed n determined based on one or more signals (e.g., $PS_1$, $PS_2$, $PS_3$) from position sensors (e.g., position sensors 28). In this way, motor 16 may be controlled using a redundant system that is accurate under various operating conditions.

It will be apparent to those skilled in the art that various modifications and variations can be made to the disclosed methods and systems. Other embodiments will be apparent to those skilled in the art from consideration of the specification and practice of the disclosed methods and systems. It is intended that the specification and examples be considered as exemplary only, with a true scope being indicated by the following claims and their equivalents.

What is claimed is:
1. A method of controlling a motor, comprising:
   generating a first motor controlling parameter measurement based on a signal received from a position sensor, the first motor controlling parameter measurement including a first electrical angle measurement;
   generating a second motor controlling parameter measurement based on one or more motor electrical parameters, including obtaining a second electrical angle measurement based on current signals determined at least by voltage potentials associated with coils of the motor, the second motor controlling parameter measurement including the second electrical angle measurement;
   comparing the first motor controlling parameter measurement and the second motor controlling parameter measurement to determine a third motor controlling parameter measurement, including comparing the first electrical angle measurement and the second electrical angle measurement to determine a third electrical angle measurement; and
   controlling operation of the motor based on at least one of the first motor controlling parameter measurement, the second motor controlling parameter measurement, or the third motor controlling parameter measurement.
2. The method of claim 1, further comprising selecting one of the first and second motor controlling parameter measurements based on a comparison of the first and second motor controlling parameter measurements.

3. The method of claim 1, wherein the third motor controlling parameter measurement is determined by modifying one of the first and second motor controlling parameter measurements based on the other of the first and second motor controlling parameter measurements.

4. The method of claim 1, wherein the first motor controlling parameter measurement is determined based on information generated by only one Hall Effect sensor.

5. The method of claim 1, wherein the first motor controlling parameter is determined based on information generated by a plurality of Hall Effect sensors, an encoder, a resolver, or a magnetoresistance sensor.

6. The method of claim 1, wherein controlling the operation of the motor includes controlling commutation of a plurality of motor windings of the motor.

7. The method of claim 1, further comprising determining whether a motor stall event occurred based on the one or more motor electrical parameters and the signal received from the position sensor.

8. The method of claim 7, wherein determining whether the motor stall event occurred includes:
generating a first rotational speed measurement based on the signal received from the position sensor;
generating a second rotational speed measurement based on the one or more motor electrical parameters; and
comparing the first and second rotational speed measurements to determine whether the motor stall event occurred.

9. The method of claim 7, wherein determining whether the motor stall event occurred includes:
generating a first rotational speed measurement based on the signal received from the position sensor;
determining a reference speed based on a reference speed signal; and
comparing the first rotational speed measurement with the reference speed to determine whether the motor stall event occurred.

10. The method of claim 7, further comprising continuing to control the operation of the motor based on one of the first and second motor controlling parameter measurements selected based on a comparison of the first and second motor controlling parameter measurements in response to determining that the motor stall event have not occurred.

11. The method of claim 10, further comprising:
selecting the other of the first and second motor controlling parameter measurements in response to determining that the motor stall event has occurred; and
controlling subsequent operation of the motor based on the selected other one of the first and second motor controlling parameter measurements.

12. The method of claim 7, further comprising generating a feedback signal in response to determining that the motor stall event has occurred.

13. The method of claim 12, wherein the feedback signal is indicative of the motor stall event.

14. The method of claim 12, further comprising sending the feedback signal to a flight controller.

15. The method of claim 7, further comprising stopping the motor in response to determining that the motor stall event has occurred.

16. The method of claim 7, further comprising decreasing an input power to the motor in response to determining that the motor stall event has occurred.

17. The method of claim 7, further comprising increasing an input power to the motor in response to determining that the motor stall event has been eliminated.

18. A system for controlling a motor, comprising:
a controller having one or more processors and being configured to:
determine a first motor controlling parameter measurement based on a signal received from a position sensor, the first motor controlling parameter measurement including a first electrical angle measurement;
determine a second motor controlling parameter measurement based on one or more motor electrical parameters, including obtaining a second electrical angle measurement based on current signals determined at least by voltage potentials associated with coils of the motor, the second motor controlling parameter measurement including the second electrical angle measurement;
compare the first motor controlling parameter measurement and the second motor controlling parameter measurement to determine a third motor controlling parameter measurement, including compare the first electrical angle measurement and the second electrical angle measurement to determine a third electrical angle measurement; and
control operation of the motor based on at least one of the first motor controlling parameter measurement, the second motor controlling parameter measurement, or the third motor controlling parameter measurement.

19. An unmanned aerial vehicle (UAV) system, comprising:
a motor operable to drive one or more propulsion devices; and
a controller in communication with the motor and configured to control operation of the motor, the controller comprising one or more processors configured to:
determine a first motor controlling parameter measurement based on a signal received from a position sensor, the first motor controlling parameter measurement including a first electrical angle measurement;
determine a second motor controlling parameter measurement based on motor electrical parameters, including obtaining a second electrical angle measurement based on current signals determined at least by voltage potentials associated with coils of the motor, the second motor controlling parameter measurement including the second electrical angle measurement;
compare the first motor controlling parameter measurement and the second motor controlling parameter measurement to determine a third motor controlling parameter measurement, including compare the first electrical angle measurement and the second electrical angle measurement to determine a third electrical angle measurement; and
control operation of the motor based on at least one of the first motor controlling parameter measurement, the second motor controlling parameter measurement, or the third motor controlling parameter measurement.

* * * * *